US007996098B2

(12) United States Patent
Dickinson et al.

(10) Patent No.: US 7,996,098 B2
(45) Date of Patent: Aug. 9, 2011

(54) REACTIVE REPLENISHABLE DEVICE MANAGEMENT

(75) Inventors: Blake Dickinson, Monrovia, CA (US); Lisa Lei Horiuchi, Los Angeles, CA (US); Nathaniel Jordan Ramer, Los Angeles, CA (US)

(73) Assignee: Aerovironment, Inc., Monrovia, CA (US)

( * ) Notice: Subject to any disclaimer, the term of this patent is extended or adjusted under 35 U.S.C. 154(b) by 0 days.

(21) Appl. No.: 12/234,441

(22) Filed: Sep. 19, 2008

(65) Prior Publication Data

US 2009/0024232 A1    Jan. 22, 2009

Related U.S. Application Data

(63) Continuation of application No. 10/974,392, filed on Oct. 26, 2004, now Pat. No. 7,444,192.

(51) Int. Cl.
*H02J 7/00* (2006.01)
*G01N 27/416* (2006.01)
*G01N 27/42* (2006.01)
*G05B 15/00* (2006.01)

(52) U.S. Cl. ......... 700/80; 324/430; 324/425; 324/426; 324/427; 320/130; 320/132

(58) Field of Classification Search .................. None
See application file for complete search history.

(56) References Cited

U.S. PATENT DOCUMENTS

| | | | |
|---|---|---|---|
| 3,781,658 A | 12/1973 | Godshalk | |
| 4,293,842 A | 10/1981 | Tanaka et al. | |
| 4,398,172 A | 8/1983 | Carroll et al. | |
| 4,418,310 A | 11/1983 | Bollinger | |
| 4,522,896 A | 6/1985 | Iseard | |
| 4,560,937 A * | 12/1985 | Finger | 324/433 |
| 4,885,523 A | 12/1989 | Koenck | |
| 5,321,626 A | 6/1994 | Palladino | |
| 5,345,163 A * | 9/1994 | Gibbons et al. | 320/163 |

(Continued)

FOREIGN PATENT DOCUMENTS

EP    0 622 859 B1    1/1997

(Continued)

OTHER PUBLICATIONS

Office Action received in U.S. Appl. No. 10/974,392, mailed Mar. 6, 2007.

(Continued)

*Primary Examiner* — Albert Decady
*Assistant Examiner* — Sunray Chang
(74) *Attorney, Agent, or Firm* — Nathan O. Greene; Brinks Hofer Gilson & Lione; Eric J. Aagaard

(57) ABSTRACT

Reactive replenishable device management comprises receiving device measurement data from at least one device, updating one or more device usage profiles associated with the at least one device, and if an analysis of the one or more device usage profiles indicates usage of the at least one device is sub-optimal, performing one or more of: controlling at least one of an attribute or an operation of the at least one device, issuing one or more device management recommendations to a user of the at least one device, and issuing one or more user alerts to the user. The at least one device comprises at least one of one or more replenishable devices, one or more replenishers associated with the one or more replenishable devices, and one or more other devices associated with the one or more replenishable devices.

10 Claims, 21 Drawing Sheets

U.S. PATENT DOCUMENTS

| | | | |
|---|---|---|---|
| 5,349,535 A * | 9/1994 | Gupta | 702/63 |
| 5,450,321 A | 9/1995 | Crane | |
| 5,453,334 A | 9/1995 | Melichar | |
| 5,495,503 A | 2/1996 | King et al. | |
| 5,545,967 A | 8/1996 | Osborne et al. | |
| 5,631,536 A | 5/1997 | Tseng | |
| 5,646,507 A | 7/1997 | Timmons et al. | |
| 5,698,967 A | 12/1997 | Baer et al. | |
| 5,701,068 A | 12/1997 | Baer et al. | |
| 5,710,503 A | 1/1998 | Sideris et al. | |
| 5,812,070 A | 9/1998 | Tagami et al. | |
| 5,895,440 A | 4/1999 | Proctor et al. | |
| 6,014,019 A * | 1/2000 | Parker | 323/273 |
| 6,018,228 A | 1/2000 | Dias et al. | |
| 6,236,188 B1 | 5/2001 | Beckerman et al. | |
| 6,424,157 B1 * | 7/2002 | Gollomp et al. | 324/430 |
| 6,510,403 B1 | 1/2003 | Ghaseminejad | |
| 6,510,408 B1 | 1/2003 | Hermansen | |
| 6,532,425 B1 | 3/2003 | Boost et al. | |
| 6,555,991 B1 | 4/2003 | Zettel et al. | |
| 6,558,833 B2 * | 5/2003 | McCoy | 429/70 |
| 6,735,536 B2 | 5/2004 | Rider | |
| 6,813,526 B1 | 11/2004 | Dodd, Jr. | |
| 6,902,136 B2 | 6/2005 | Mackness | |
| 6,922,151 B2 * | 7/2005 | Kawakami | 340/636.1 |
| 6,983,212 B2 | 1/2006 | Burns | |
| 7,057,372 B2 | 6/2006 | Chen et al. | |
| 7,058,427 B2 | 6/2006 | Villaret | |
| 7,078,877 B2 | 7/2006 | Salasoo et al. | |
| 7,165,040 B2 | 1/2007 | Ehrman et al. | |
| 7,233,127 B2 | 6/2007 | Chen et al. | |
| 7,444,192 B2 | 10/2008 | Dickinson et al. | |
| 7,707,054 B2 | 4/2010 | Ehrman et al. | |
| 2003/0015993 A1 | 1/2003 | Misra et al. | |
| 2004/0155661 A1 | 8/2004 | Field et al. | |
| 2005/0027466 A1 | 2/2005 | Steinmetz et al. | |
| 2006/0030983 A1 | 2/2006 | Bautista | |
| 2006/0089733 A1 | 4/2006 | Dickinson et al. | |
| 2006/0108956 A1 | 5/2006 | Clark et al. | |
| 2006/0281000 A1 | 12/2006 | Hayashigawa | |
| 2009/0024232 A1 | 1/2009 | Dickinson et al. | |
| 2009/0064311 A1 | 3/2009 | Clark et al. | |

FOREIGN PATENT DOCUMENTS

| | | |
|---|---|---|
| JP | 2002-123888 A | 4/2002 |
| JP | 2002-140797 A | 5/2002 |
| KR | 0331951 | 11/2001 |
| WO | WO 96/22625 A1 | 7/1996 |
| WO | WO 2006/047636 A2 | 5/2006 |

OTHER PUBLICATIONS

Office Action received in U.S. Appl. No. 10/974,392, mailed Aug. 27, 2007.
Notice of Allowance received in U.S. Appl. No. 10/974,392, mailed May 14, 2008.
Office Action received in U.S. Appl. No. 10/974,335, mailed Sep. 29, 2008.
Office Action received in U.S. Appl. No. 10/974,335, mailed Jun. 10, 2009.
Office Action received in U.S. Appl. No. 10/974,335, mailed Dec. 24, 2009.
Supplementary European Search Report for EP05 81 5358, dated Jul. 29, 2009.
International Search Report, PCT/US05/39214, mailed Aug. 8, 2008.
U.S. Appl. No. 10/974,335, filed Oct. 26, 2004.
U.S. Appl. No. 12/880,033, filed Sep. 10, 2010.
Korean Office Action in Korean Application No. 10-2009-7016223, dated Oct. 18, 2010.
Office Action in U.S. Appl. No. 10/974,335, dated Sep. 16, 2010.
Office Action in U.S. Appl. No. 10/974,335, dated Jan. 5, 2011.
Japanese Office Action in Japanese Application No. 2007539084, mailed Nov. 30, 2010.
CDAC, "Fleet Management System for Industrial Battery Chargers," Ametek Prestolite Power, 4 pages (2000).

* cited by examiner

REACTIVE REPLENISHABLE DEVICE MANAGEMENT

CROSS REFERENCE TO RELATED APPLICATIONS

The present application is a continuation of U.S. patent application Ser. No. 10/974,392, filed Oct. 26, 2004, entitled, "Reactive Replenishable Device Management," now U.S. Pat. No. 7,444,192, commonly assigned herewith.

The present application is also related to co-pending U.S. patent application Ser. No. 10/974,335 filed Oct. 26, 2004 in the name of inventors Blake Dickinson, Lisa Lei Horluchi, and Nathaniel Jordan Ramer, entitled "Dynamic Replenisher Management", commonly assigned herewith.

FIELD OF THE INVENTION

The present invention relates to the field of computer science. More particularly, the present invention relates to reactive replenishable device management.

BACKGROUND OF THE INVENTION

Systems for monitoring numerous replenishable device parameters are known in the art. Such systems typically collect battery pack information, recharger information, or both, and make the information available for viewing by an operator. While such systems typically provide visibility with respect to parameters of a particular charger or replenishable device, acting upon these parameters is typically left to operator. Furthermore, operators responsible for multiple devices must scrutinize similar information for several devices in order to determine optimal replenishable device asset allocation. Thus the burden on the operator increases as the number of replenishable device assets increases.

Accordingly, a need exists in the art for a solution that provides relatively integrated replenishable device management. A further need exists for such a solution that is relatively automated. Yet a further need exists for such a solution that provides relatively efficient replenishable device asset resource allocation.

SUMMARY OF THE INVENTION

Reactive replenishable device management comprises receiving device measurement data from at least one device, updating one or more device usage profiles associated with the at least one device, and if an analysis of the one or more device usage profiles indicates usage of the at least one device is sub-optimal, performing one or more of: controlling at least one of an attribute or an operation of the at least one device, issuing one or more device management recommendations to a user of the at least one device, and issuing one or more user alerts to the user. The at least one device comprises at least one of one or more replenishable devices, one or more replenishers associated with the one or more replenishable devices, and one or more other devices associated with the one or more replenishable devices.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
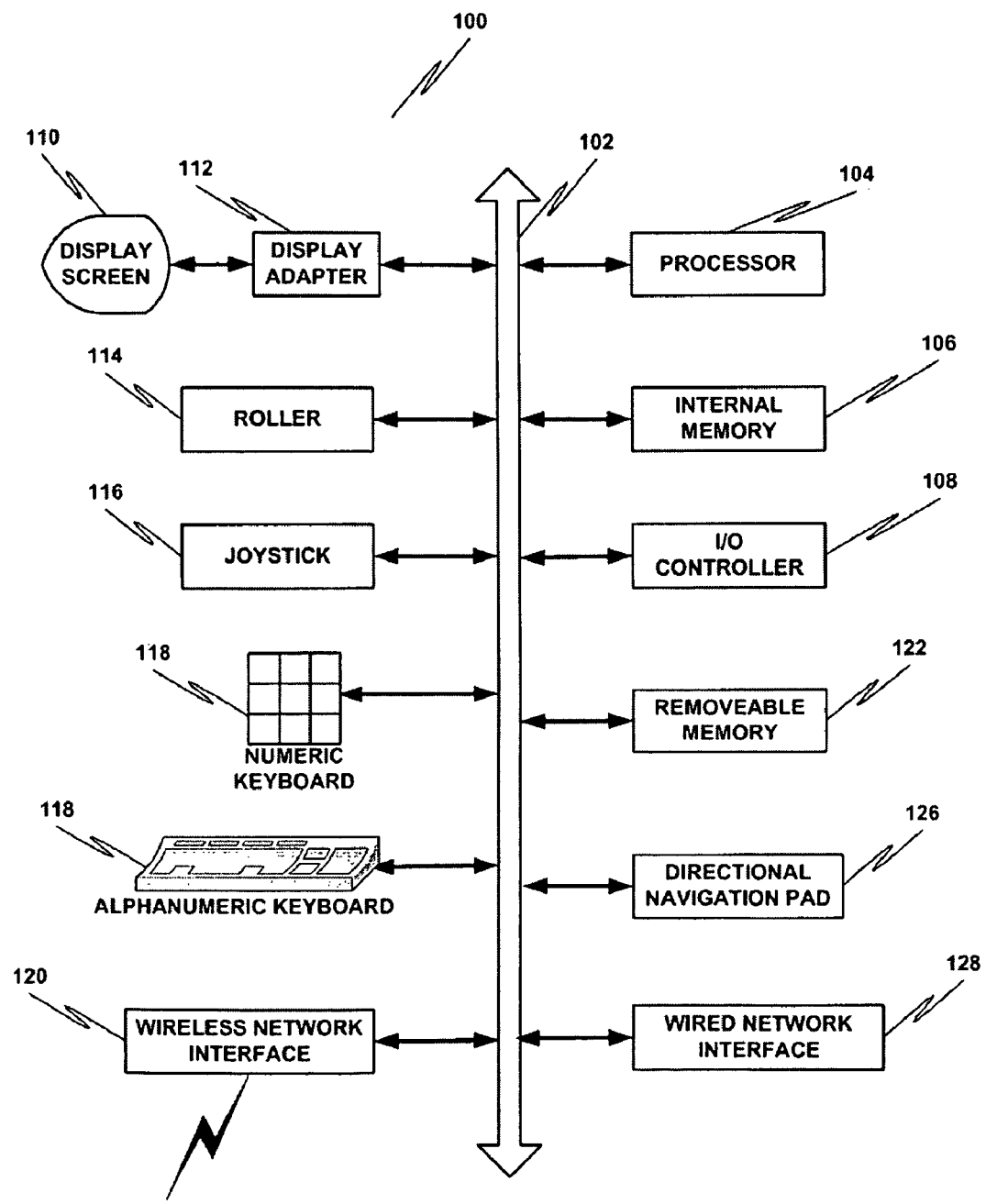
FIG. 1 is a block diagram of a computer system suitable for implementing aspects of the present invention.

Embodiments of the present invention are described herein in the context of reactive replenishable device management. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

In the context of the present invention, the term "identification data" describes one or more time-invariant attributes of a device. By way of example, identification data comprises an identifier of the device, the size of the device, the capacity of the device, the manufacturer of the device, the maintenance schedule of the device, the warranty schedule of the device, and the like.

In the context of the present invention, the term "historical data" describes one or more time-variant attributes of a device. Exemplary historical data are shown in Table 1, below.

TABLE 1

| Historical Data |
| --- |
| Date Battery Monitor Identification (BMID) Was Initialized |
| Days in Operation |
| Total Charge Ahs |
| Total Charge kilowatt-hours |
| Total Discharge Ahs |
| Total Discharge kilowatt-hours |
| Total Fast Charge Time |
| # of Fast Charge Events |
| Total Full Charge Time |
| Number of Complete Full Charge Events |

TABLE 1-continued

Historical Data

Total Equalization Charge Time
Number of Complete Equalization Charge Events
Total External Charge Time
Total Run Time
Total Key On Time
Total Key Off Time
Maximum Battery Temperature $T_1$
Number of Times the Battery Exceeds Temperature $T_1$
Minimum Battery Temperature $T_2$
Number of Times the Battery Temperature falls below $T_2$
Average Battery Temperature
Minimum Battery Voltage $V_1$
Number of Times the Battery Voltage Falls Below $V_1$
Maximum Battery Voltage $V_2$
Number of Times the Battery State-Of-Charge Falls Below 20%
Number of Low Water Events
Last Equalization Start Date
Last Equalization Start Time
Last Equalization End Date
Last Equalization End Time
Last Equalization Ahs
Last Equalization kilowatt-hours
Last Equalization Term Code
Last Equalization Start Temperature
Last Equalization Start Voltage
Last Equalization Start Current
Last Equalization End Temperature
Last Equalization End State-Of-Charge
Last Equalization End Voltage
Last Equalization End Current
Maximum Days Between Equalizations
Maximum Ahs Between Equalizations
Days Since Last Complete Equalization
Ahs Since Last Complete Equalization In the context of the present invention, the term "real-time data" describes a single sample of one or more time-variant attributes of a device. Real-time data comprises real-time descriptive data and real-time performance data. Exemplary real-time data are shown in Table 2, below. The real-time data in Table 2 is illustrative and is not intended to be an exhaustive list. Those of ordinary skill in the art will recognize that other real-time data may be used.

TABLE 2

Real-Time Data

Charge Ahs
Discharge Ahs
Charge Kilowatt-hours
Discharge Kilowatt-hours
Fast Charge Time
Full Charge Time
Equalization Charge Time
Key On Time
Key Off Time
Run Time
Full Charge Complete
Equalization Complete
Minimum Battery State-Of-Charge
Maximum Battery State-Of-Charge
Average Battery State-Of-Charge
Minimum Battery Temperature $T_2$
Maximum Battery Temperature $T_1$
Average Battery Temperature
Minimum Battery Voltage $V_1$
Maximum Battery Discharge Current
Low Water Event
Fault Code(s)

FIG. 1 depicts a lock diagram of a computer system 100 suitable for implementing aspects of the present invention. As shown in FIG. 1, computer system 100 includes a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 106 or stored on storage media such as fixed disk 120, floppy disk 124, or CD-ROM 128.

Figure 2:
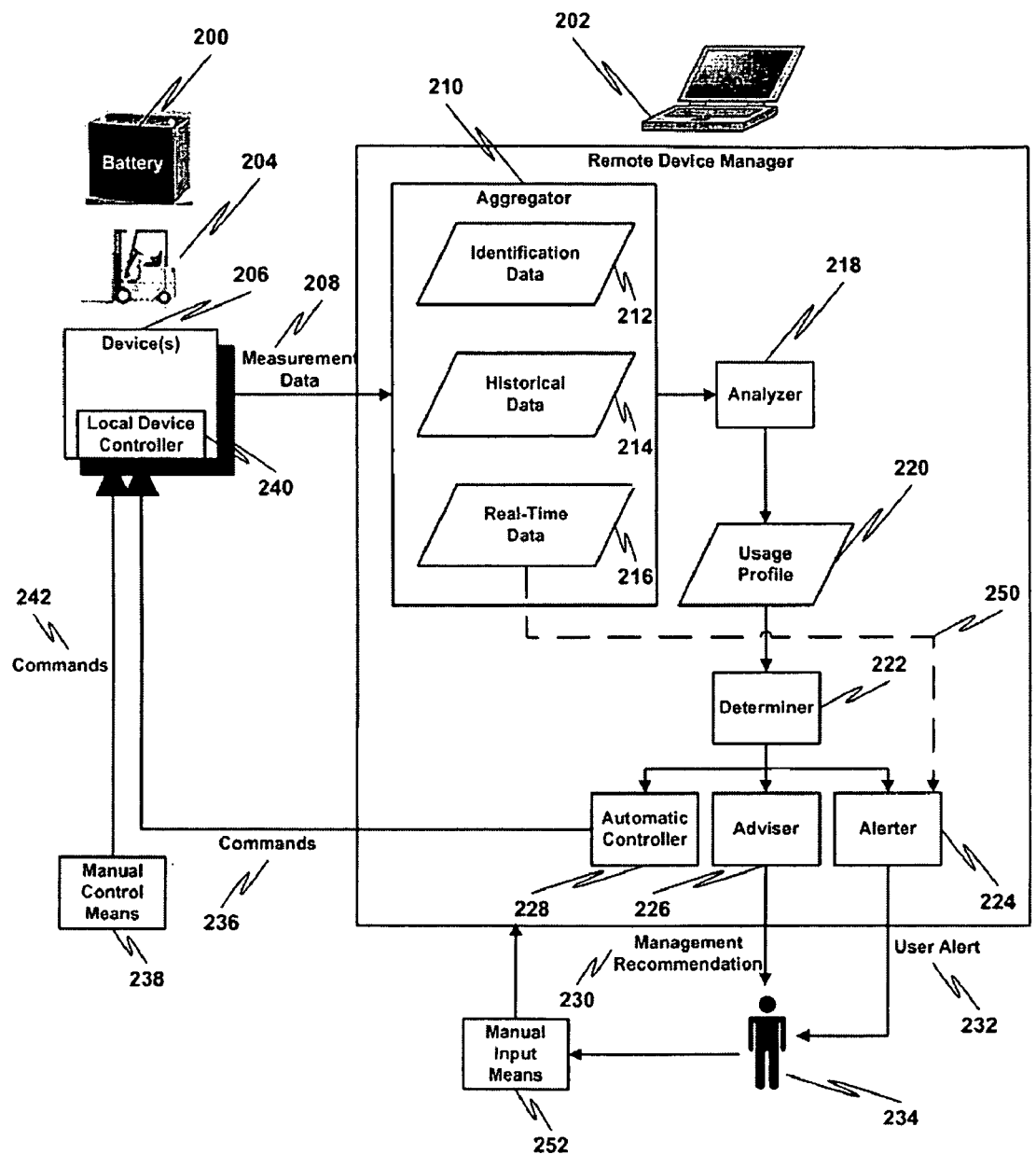
FIG. 2 is a block diagram that illustrates a system for reactive control of one or more devices based at least in part on device measurement data obtained from the one or more devices in accordance with one embodiment of the present invention.
Figure 3:
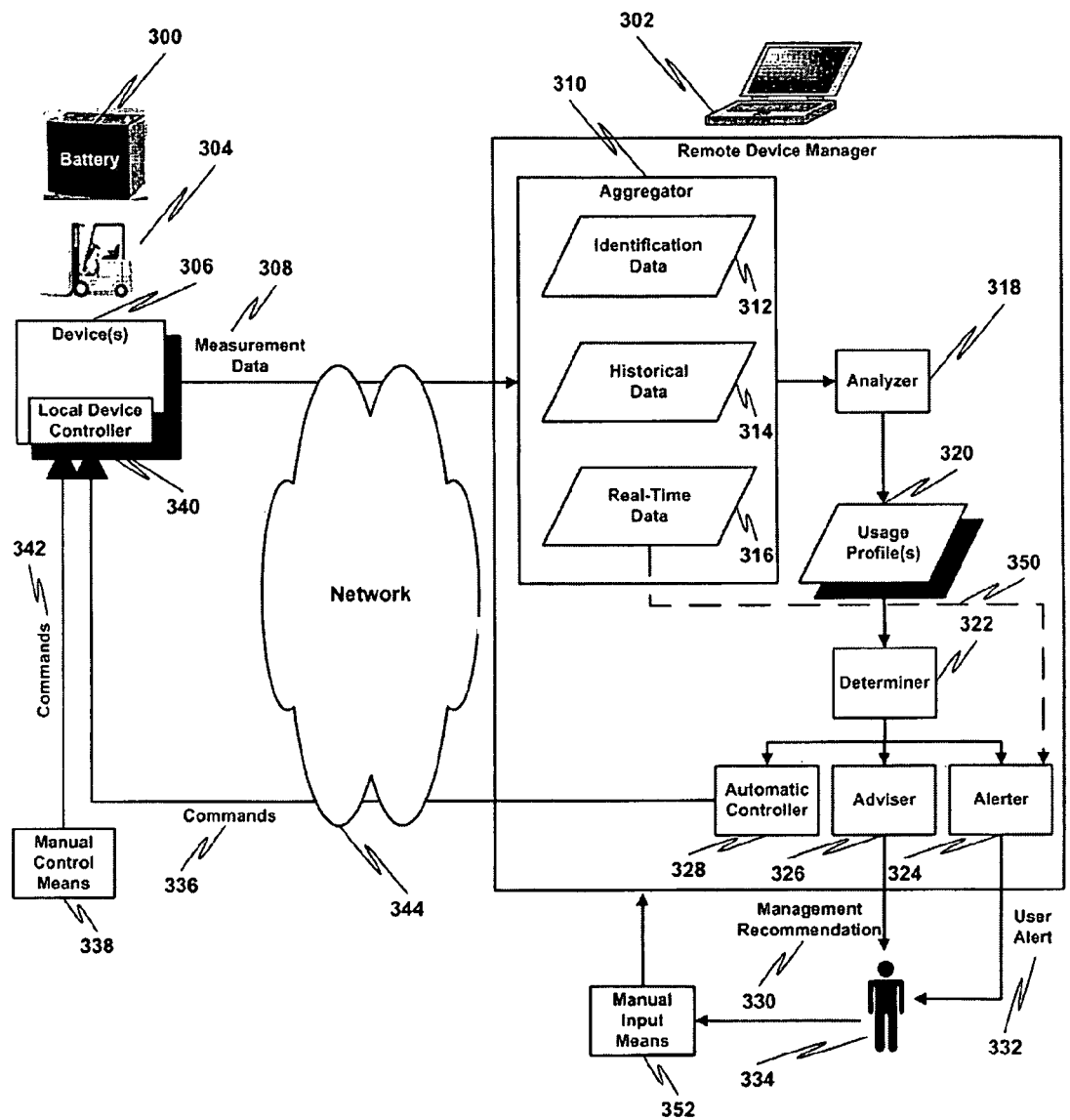
FIG. 3 is a block diagram that illustrates a system for reactive control of one or more networked devices based at least in part on device measurement data obtained from the one or more devices in accordance with one embodiment of the present invention.
Figure 3A:
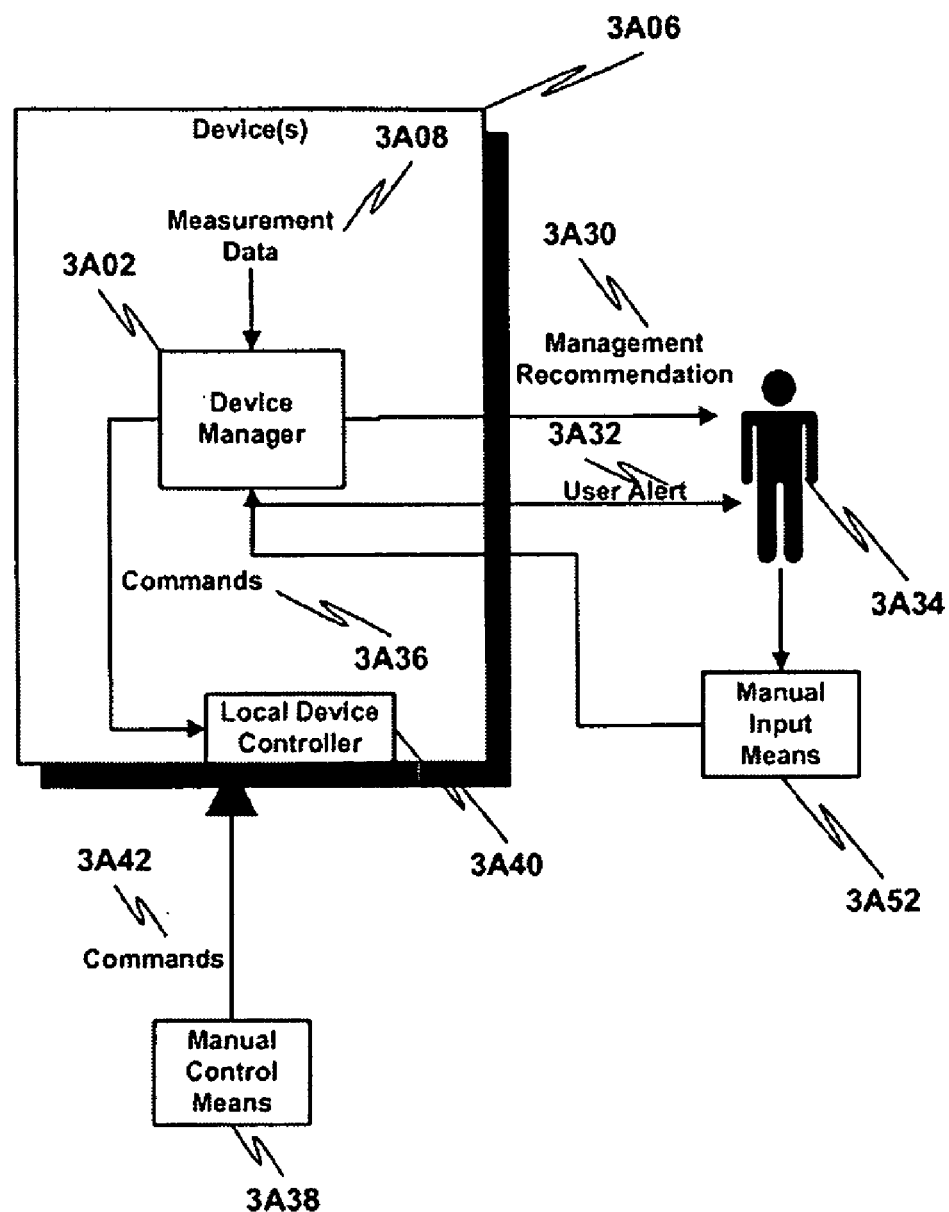
FIG. 3A is a block diagram that illustrates an apparatus for reactive control of one or more devices based at least in part on device measurement data obtained from the one or more devices in accordance with one embodiment of the present invention.

FIGS. 2, 3, and 3A illustrate systems for reactive control of one or more devices based at least in part on device measurement data obtained from the one or more devices in accordance with embodiments of the present invention. FIG. 2 illustrates the one or more devices operatively coupled via a dedicated communication means to a remote device manager adapted to control the one or more devices. FIG. 3 illustrates the one or more devices and the remote device manager operatively coupled via a network. FIG. 3A illustrates the device manager as part of the one or more devices.

Turning now to FIG. 2, a block diagram that illustrates a system for reactive control of one or more devices based at least in part on device measurement data obtained from the one or more devices in accordance with one embodiment of the present invention is presented. As shown in FIG. 2, one or more devices 206 comprise a local device controller 240 adapted to control the one or more devices 206 based at least in part on one or more commands from manual control means 238, or automatic controller 228. Battery 200 and vehicle 204 are exemplary devices represented by one or more devices 206. Remote device manager 202 may receive input via manual input means 252. The type of input received via manual input means 252 may vary depending at least in part on the particular device or devices being managed. Exemplary manual inputs are listed below in Table 3. The manual input data in Table 3 is illustrative and is not intended to be an exhaustive list. Those of ordinary skill in the art will recognize that other manual input data may be used. Manual input means 252 comprises an input device, such as alphanumeric keyboard 118, numeric keyboard 118, joystick 116, roller 114, directional navigation pad 126, or display screen 110 of FIG. 1. Those of ordinary skill in the art will recognize that other input devices may be used.

TABLE 3

Manual Inputs

Utility Schedule
Vehicle Pricing
Replenishable Device Pricing
Vehicle Purchase Profile
Replenishable Device Purchase Profile
Maintenance Schedule
Dealer/Distributor Contact Information
Plant Operation Schedule
Driver Associated with a Particular Vehicle
Vehicle Type of a Particular Vehicle
Vehicle Location
Charger Associated with a Particular Vehicle
Vehicle Periodic Maintenance Log/Status
Local Daylight Savings Time
Rechargeable Device Manufacture Date
Vehicle Manufacture Date
Driver Complaints for a Particular Vehicle
Operator Schedule
Utility Power Purchase Agreement(s)

According to one embodiment of the present invention, the one or more devices 206 comprise one or more replenishers and one or more replenishable devices. According to one embodiment of the present invention, the one or more replenishers comprise one or more refuelers and the one or more replenishable devices comprises one or more refuelable devices. By way of example, the one or more refuelable devices may comprise a fuel cell. According to another embodiment of the present invention, the one or more devices comprises one or more replenishers and one or more rechargeable devices. According to one embodiment of the present invention, the one or more replenishers comprises one or more chargers and the one or more replenishable devices comprises one or more batteries. According to another embodiment of the present invention, the one or more chargers comprise battery chargers and the one or more batteries comprise one or more replaceable battery packs. According to another embodiment of the present invention, the one or more devices 206 further comprises an electric vehicle powered by the one or more replaceable battery packs. According to another embodiment of the present invention, the one or more devices 206 further comprises a vehicle powered by one or more replaceable or refuelable fuel cells. The vehicle may be any vehicle that is powered at least in part by a replenishable device. By way of example, the vehicle may comprise an electrically- or fuel cell-powered fork lift, automobile, truck, motorcycle, moped, scooter, airplane, locomotive, submersible vessel, boat, spacecraft, automated guided vehicle (AGV), and automated unguided vehicle (AUGV).

According to embodiments of the present invention, the replaceable battery packs are based on one or more of the following battery technologies: lead acid, nickel cadmium, nickel metal hydride, nickel zinc, nickel iron, silver zinc, nickel hydrogen, lithium ion, lithium polymer, lithium/iron sulfide, zinc air, zinc bromine, sodium sulfur, regenerative fuel cell, and ultracapacitor. The battery technologies listed are for the purpose of illustration and are not intended to be limiting in any way. Those of ordinary skill in the art will recognize that replaceable battery packs based on other battery technologies may be used.

According to another embodiment of the present invention, the one or more devices 206 comprises a vehicle powered by the one or more replenishable devices, and the one or more devices 206 further comprises one or more devices that reside in, on, or are otherwise associated with the vehicle. By way of example, the one or more devices may comprise one or more movement sensors, access control devices, shock meters, force meters, and the like.

According to another embodiment of the present invention, the one or more devices 206 comprises automation equipment.

According to another embodiment of the present invention, the one or more devices 206 comprises energy management systems, such as distributed generation equipment and the like.

Still referring to FIG. 2, remote device manager 202 comprises an aggregator 210, an analyzer 218, a determiner 222, an automatic controller, an advisor 226, and an alerter 224. Aggregator 210 is adapted to receive device measurement data 208 from the one or more devices 206. The received device measurement data 208 comprises one or more of identification data 212, historical data 214, and real-time data 216. Analyzer 218 is adapted to update one or more usage profiles 220 based at least in part on one or more of the identification data 212, the historical data 214, and the real-time data 216.

The one or more usage profiles 220 comprise information regarding the use of the one or more devices 206. The one or more usage profiles 220 may be stored in a memory (not shown in FIG. 2) associated with the remote device manager 202.

Determiner 222 is adapted to invoke one or more of automatic controller 228, advisor 226, and alerter 224 based at least in part on the one or more usage profiles 220. Automatic controller 228 is adapted to automatically control attributes or operations of the one or more devices based at least in part on the device measurement data 208 obtained from the one or more devices 206 by issuing one or more commands 236 to the one or more devices 206. Automatic controller 228 is described in more detail below with respect to FIGS. 5-8. Advisor 226 is adapted to issue one or more management recommendations to a user 234, based at least in part on the device measurement data 208 obtained from the one or more devices. Advisor 226 is described in more detail below with respect to FIGS. 9-11. Alerter 224 is adapted to issue one or more user alerts to the user 234, based at least in part on the device measurement data 208 obtained from the one or more devices 206 (either directly from real-time data 216 as shown by reference numeral 250, or from usage profile 220). Alerter 224 is described in more detail below with respect to FIGS. 12-14. Manual control means 238 may be used by user 234 to control the one or more devices 206 based at least in part on one or more management recommendations received from advisor 226, or one or more user alerts received from alerter 224. Manual control means 238 comprises an input device, such as alphanumeric keyboard 118, numeric keyboard 118, joystick 116, roller 114, directional navigation pad 126, or display screen 110 of FIG. 1. Those of ordinary skill in the art will recognize that other input devices may be used.

In operation, device measurement data 208 is transferred from device 206 to remote device manager 202. According to one embodiment of the present invention, the transfer is initiated by the one or more devices 206. According to another embodiment of the present invention, the transfer is initiated by the remote device manager 202. Aggregator 210 of remote device manager 202 receives the device measurement data 208. Analyzer 218 updates one or more usage profiles 220 based at least in part on one or more of the identification data 212, the historical data 214, and the real-time data 216. Determiner 222 invokes zero or more of automatic controller 228, advisor 226, and alerter 224 based at least in part on the one or more usage profiles 220. Automatic controller 228 automatically controls attributes or operations of the one or more devices 206 based at least in part on the device measurement data 208 obtained from the one or more devices 206 by issuing one or more commands 236 to the one or more devices 206. Advisor 226 issues one or more management recommendations to a user 234, based at least in part on the device measurement data 208 obtained from the one or more devices. Alerter 224 issues one or more user alerts to the user 234, based at least in part on the device measurement data 208 obtained from the one or more devices 206.

According to one embodiment of the present invention, remote device manager 202 comprises one or more of automatic controller 228, adviser 226, and alerter 224.

Turning now to FIG. 3, a block diagram that illustrates a system for reactive control of one or more networked devices based at least in part on device measurement data obtained from the one or more devices in accordance with one embodiment of the present invention is presented. FIG. 3 is similar to FIG. 2, except that the one or more devices illustrated in FIG. 3 are operatively coupled to a remote device manager via a network. As shown in FIG. 3, one or more devices 306 comprise a local device controller 340 adapted to control the one or more devices 306 based at least in part on one or more commands from manual control means 338, or automatic controller 328. Battery 300 and vehicle 304 are exemplary devices represented by one or more device 306. The one or more devices 306 are operatively coupled to a remote device manager 302 via a network 344. At least part of network 344 may reside inside or outside of a physical facility where one or more of the one or more devices 306 and the remote device manager 302 are located. Remote device manager 302 may receive input via manual input means 352. The type of input received via manual input means 352 may vary depending at least in part on the particular device or devices being managed. Exemplary manual inputs are listed above in Table 3. The manual input data in Table 3 is illustrative and is not intended to be an exhaustive list. Those of ordinary skill in the art will recognize that other manual input data may be used. Manual input means 352 comprises an input device, such as alphanumeric keyboard 118, numeric keyboard 118, joystick 116, roller 114, directional navigation pad 126, or display screen 110 of FIG. 1. Those of ordinary skill in the art will recognize that other input devices may be used.

According to one embodiment of the present invention, the one or more devices 306 comprise one or more replenishers and one or more replenishable devices. According to one embodiment of the present invention, the one or more replenishers comprise one or more refuelers and the one or more replenishable devices comprises one or more refuelable devices. By way of example, the one or more refuelable devices may comprise a fuel cell. According to another embodiment of the present invention, the one or more devices comprises one or more replenishers and one or more rechargeable devices. According to one embodiment of the present invention, the one or more replenishers comprises one or more chargers and the one or more replenishable devices comprises one or more batteries. According to another embodiment of the present invention, the one or more chargers comprise battery chargers and the one or more batteries comprise one or more replaceable battery packs. According to another embodiment of the present invention, the one or more devices 306 further comprises an electric vehicle powered by the one or more replaceable battery packs. According to another embodiment of the present invention, the one or more devices 306 further comprises a vehicle powered by one or more replaceable or refuelable fuel cells. The vehicle may be any vehicle that is powered at least in part by a replenishable device. By way of example, the vehicle may comprise an electrically- or fuel cell-powered fork lift, automobile, truck, motorcycle, moped, scooter, airplane, locomotive, submersible vessel, boat, spacecraft, automated guided vehicle (AGV), and automated unguided vehicle (AUGV).

According to another embodiment of the present invention, the one or more devices 306 comprises a vehicle powered by the one or more replenishable devices, and the one or more devices 306 further comprises one or more devices that reside in, on, or are otherwise associated with the vehicle. By way of example, the one or more devices may comprise one or more movement sensors, access control devices, shock meters, force meters, and the like.

According to another embodiment of the present invention, the one or more devices 306 comprises automation equipment.

According to another embodiment of the present invention, the one or more devices 306 comprises energy management systems, such as distributed generation equipment and the like.

According to embodiments of the present invention, the replaceable battery packs are based on one or more of the following battery technologies: lead acid, nickel cadmium, nickel metal hydride, nickel zinc, nickel iron, silver zinc, nickel hydrogen, lithium ion, lithium polymer, lithium/iron sulfide, zinc air, zinc bromine, sodium sulfur, regenerative fuel cell, and ultracapacitor. The battery technologies listed are for the purpose of illustration and are not intended to be limiting in any way. Those of ordinary skill in the art will recognize that replaceable battery packs based on other battery technologies may be used.

Still referring to FIG. 3, remote device manager 302 comprises an aggregator 310, an analyzer 318, a determiner 322, an automatic controller, an advisor 326, and an alerter 324. Aggregator 310 is adapted to receive device measurement data 308 from the one or more devices 306 (either directly from real-time data 316 as shown by reference numeral 350, or from usage profile 320). The received device measurement data 308 comprises one or more of identification data 312, historical data 314, and real-time data 316. Analyzer 318 is adapted to updates one or more usage profiles 320 based at least in part on one or more of the identification data 312, the historical data 314, and the real-time data 316.

The one or more usage profiles 320 comprise information regarding the use of the one or more devices 306. The one or more usage profiles 320 may be stored in a memory (not shown in FIG. 3) associated with the remote device manager 302.

Determiner 322 is adapted to invoke one or more of automatic controller 328, advisor 326, and alerter 324 based at least in part on the one or more usage profiles 320. Automatic controller 328 is adapted to automatically control attributes or operations of the one or more devices based at least in part on the device measurement data 308 obtained from the one or more devices 306 by issuing one or more commands 336 to the one or more devices 306. Automatic controller 328 is described in more detail below with respect to FIGS. 5-8. Advisor 326 is adapted to issue one or more management recommendations to a user 334, based at least in part on the device measurement data 308 obtained from the one or more devices. Advisor 326 is described in more detail below with respect to FIGS. 9-11. Alerter 324 is adapted to issue one or more user alerts to the user 334, based at least in part on the device measurement data 308 obtained from the one or more devices 306. Alerter 324 is described in more detail below with respect to FIGS. 12-14. Manual control means 338 may be used by user 334 to control the one or more devices 306 based at least in part on one or more management recommendations received from advisor 326, or one or more user alerts received from alerter 324. Manual control means 338 comprises an input device, such as alphanumeric keyboard 118, numeric keyboard 118, joystick 116, roller 114, directional navigation pad 126, or display screen 110 of FIG. 1. Those of ordinary skill in the art will recognize that other input devices may be used.

In operation, device measurement data 308 is transferred from device 306 to remote device manager 302. According to one embodiment of the present invention, the transfer is initiated by the one or more devices 306. According to another embodiment of the present invention, the transfer is initiated by the remote device manager 302. Aggregator 310 of remote device manager 302 receives the device measurement data 308. Analyzer 318 updates one or more usage profiles 320 based at least in part on one or more of the identification data 312, the historical data 314, and the real-time data 316. Determiner 322 invokes zero or more of automatic controller 328, advisor 326, and alerter 324 based at least in part on the one or more usage profiles 320. Automatic controller 328 automatically controls operations or attributes of the one or more devices 306 based at least in part on the device measurement data 308 obtained from the one or more devices 306 by issuing one or more commands 336 to the one or more devices 306. Advisor 326 issues one or more management recommendations to a user 334, based at least in part on the device measurement data 308 obtained from the one or more devices. Alerter 324 issues one or more user alerts to the user 334, based at least in part on the device measurement data 308 obtained from the one or more devices 306.

According to one embodiment of the present invention, remote device manager 302 comprises one or more of automatic controller 328, adviser 326, and alerter 324.

Turning now to FIG. 3A, a block diagram that illustrates an apparatus for reactive control of one or more devices based at least in part on device measurement data obtained from the one or more devices in accordance with one embodiment of the present invention. Unlike FIGS. 2 and 3, FIG. 3A shows one or more devices 3A06 that comprise a device manager 3A02. Device manager 3A02 is configured to operate as discussed previously with respect to reference numeral 202 of FIG. 2 and reference numeral 302 of FIG. 3, except that the communication of measurement data 3A08 to the device manager 3A02 and the communication of commands from the device manager 3A02 to the local device controller 3A40 occurs within the one or more devices 3A06.

Figure 4:
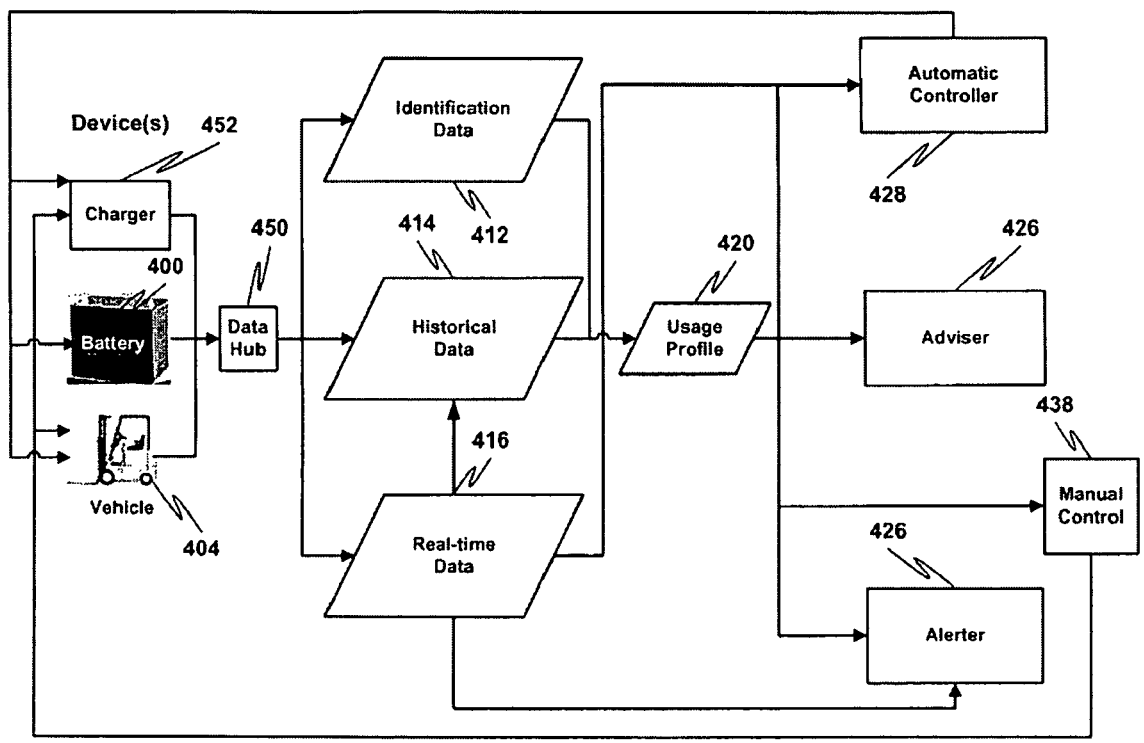
FIG. 4 is a high level data flow diagram that illustrates dynamic control of one or more devices based at least in part on device measurement data collected from the one or more devices in accordance with one embodiment of the present invention.

Turning now to FIG. 4, a high level data flow diagram that illustrates dynamic control of one or more devices based at least in part on device measurement data collected from the one or more devices in accordance with one embodiment of the present invention is presented. As shown in FIG. 4, device measurement data comprising one or more of identification data 412, historical performance and descriptive data 414, and real-time performance and descriptive data 416 are obtained from one or more devices, such as a charger, 452, a battery 400, and a vehicle 404. The device measurement data is analyzed to update one or more usage profiles 420. According to one embodiment of the present invention, an automatic controller 428 uses the one or more usage profiles 420 to automatically control attributes or operations of the one or more devices (400, 404, and 452). According to another embodiment of the present invention, an advisor 426 uses the one or more usage profiles 420 to issue one or more management recommendations to a user. According to another embodiment of the present invention, an alerter 426 uses the one or more usage profiles to issue one or more user alerts to a user. Having the benefit of a management recommendation from advisor 426, or an alert from alerter 426, the user may control the one or more devices (400, 404, and 452) via manual control means 438.

Figure 4A:
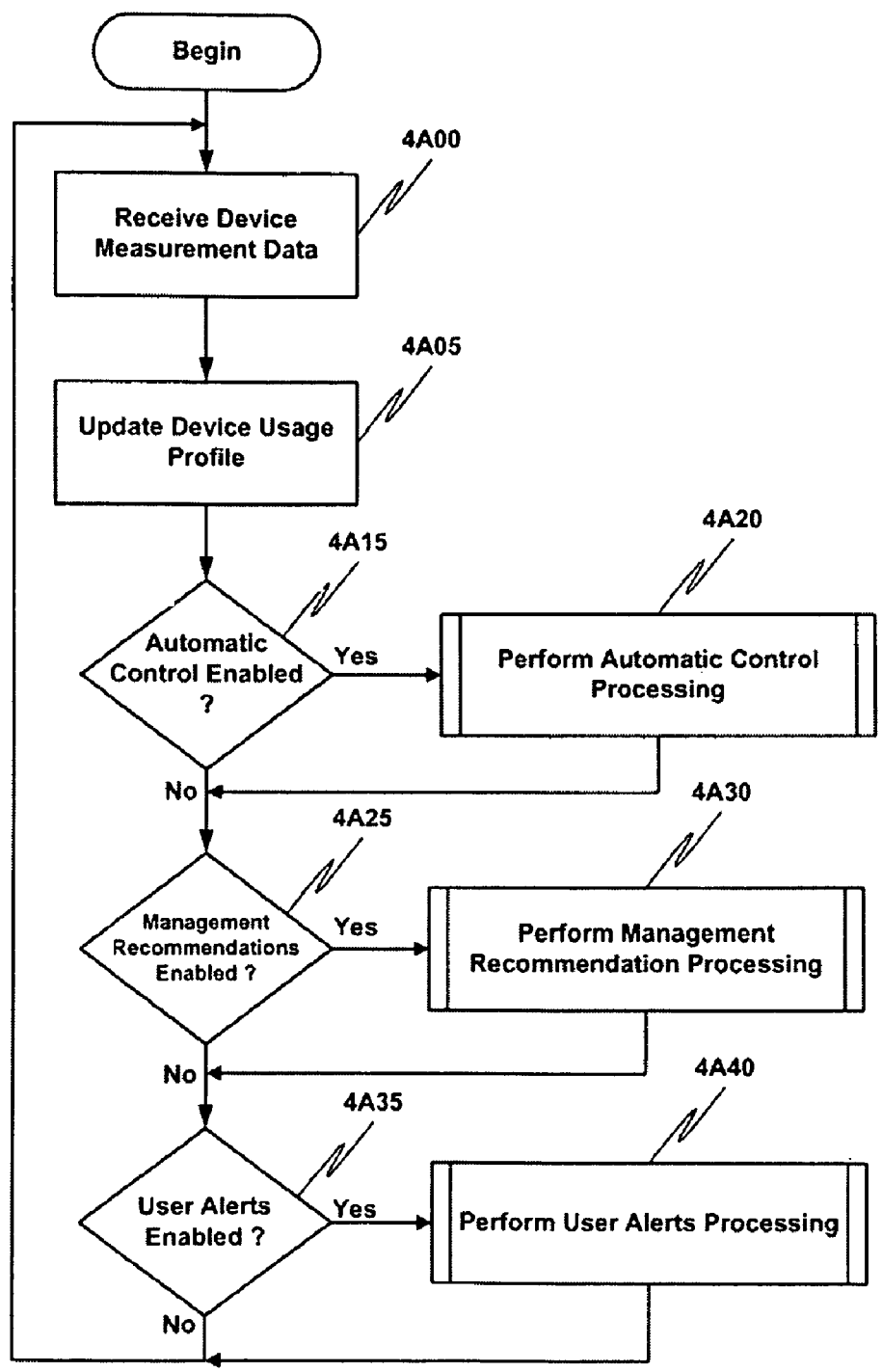
FIG. 4A is a flow diagram that illustrates a method for reactive control of one or more devices based at least in part on device measurement data obtained from the one or more devices in accordance with one embodiment of the present invention.

Turning now to FIG. 4A, a flow diagram that illustrates a method for reactive control of one or more devices based at least in part on device measurement data obtained from the one or more devices in accordance with one embodiment of the present invention is presented. FIG. 4A corresponds with FIGS. 2 and 3. The processes illustrated in FIG. 4A may be implemented in hardware, software, firmware, or a combination thereof. At 4A00, device measurement data from one or more devices is received. The device measurement data comprises one or more of identification data, historical data, and real-time data. At 4A05, one or more usage profiles associated with the device are modified based at least in part on the device measurement data. At 4A15, a determination is made regarding whether automatic control of the one or more devices is enabled. If automatic control is enabled, the automatic control is performed at 4A20. At 4A25, a determination is made regarding whether management recommendations with respect to the one or more devices are enabled. If management recommendations are enabled, the management recommendation processing is performed at 4A30. At 4A35, a determination is made regarding whether user alerts with respect to the one or more devices is enabled. If user alerts is enabled, the user alert processing is performed at 4A40.

Figure 4B:
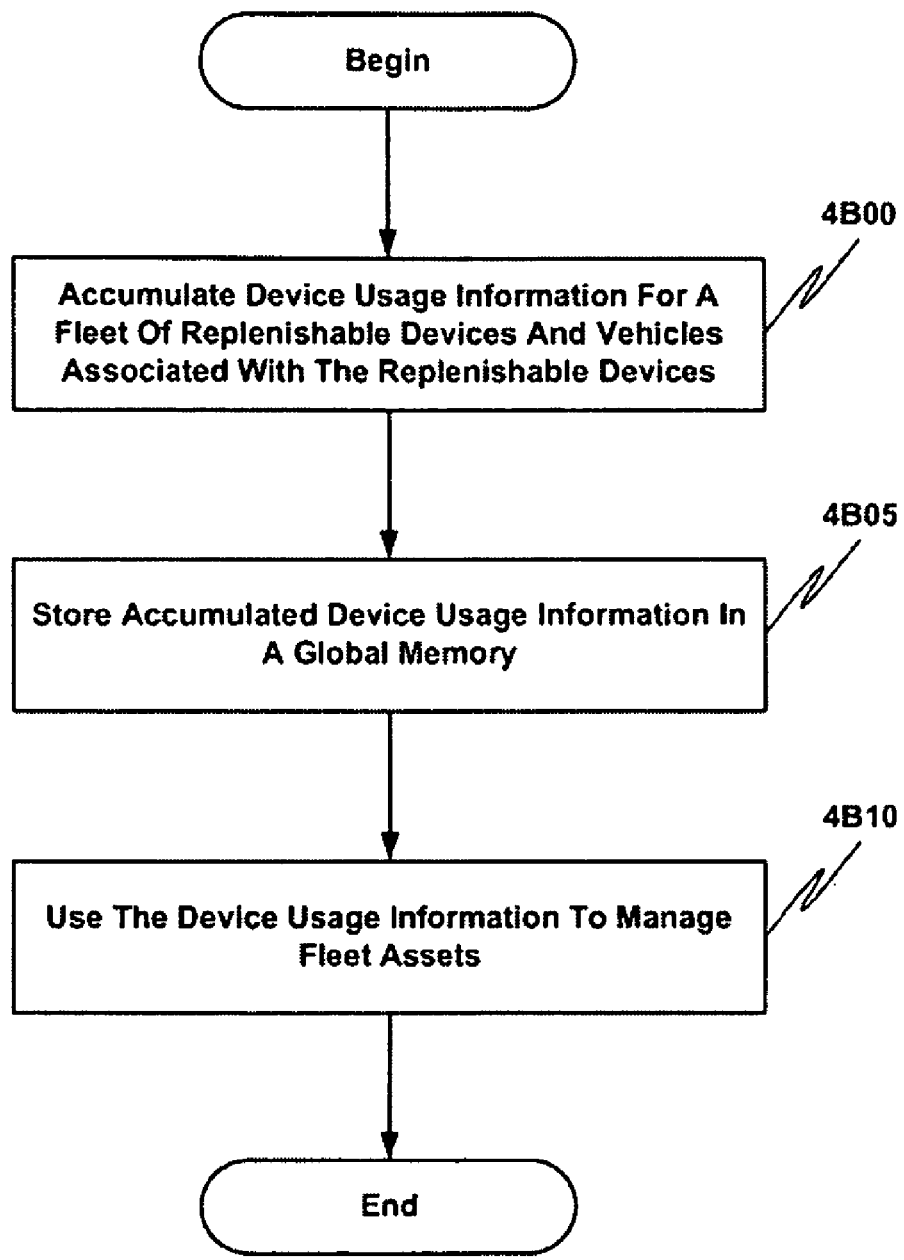
FIG. 4B is a flow diagram that illustrates a method for optimized management of a fleet of replenishable devices and devices associated with the replenishable devices, in accordance with one embodiment of the present invention.

Turning now to FIG. 4B, a flow diagram that illustrates a method for optimized management of a fleet of replenishable devices and devices associated with the replenishable devices, in accordance with one embodiment of the present invention is presented. The processes illustrated in FIG. 4B may be implemented in hardware, software, firmware, or a combination thereof. At 4B00, device usage information for a fleet of replenishable devices and vehicles associated with the replenishable devices is accumulated. Step 4B00 may be performed using the process illustrated in FIG. 4A, above. At 4B04, the accumulated device usage information is stored in a global memory. At 4B10, the device usage information accumulated at 4B00 and stored at 4B05 is used to manage fleet assets. By way of example, if the accumulated device usage information indicates a first vehicle is over utilized and a second vehicle capable of performing substantially the same functions as the first vehicle is under utilized, the first vehicle may be switched with the second vehicle. As a further example, if the accumulated device usage information indicates the fleet as a whole is over utilized, additional devices may be added to the fleet. Likewise, if the accumulated device usage information indicates the fleet as a while is under utilized, one or more devices may be removed from the fleet.

Figure 9:
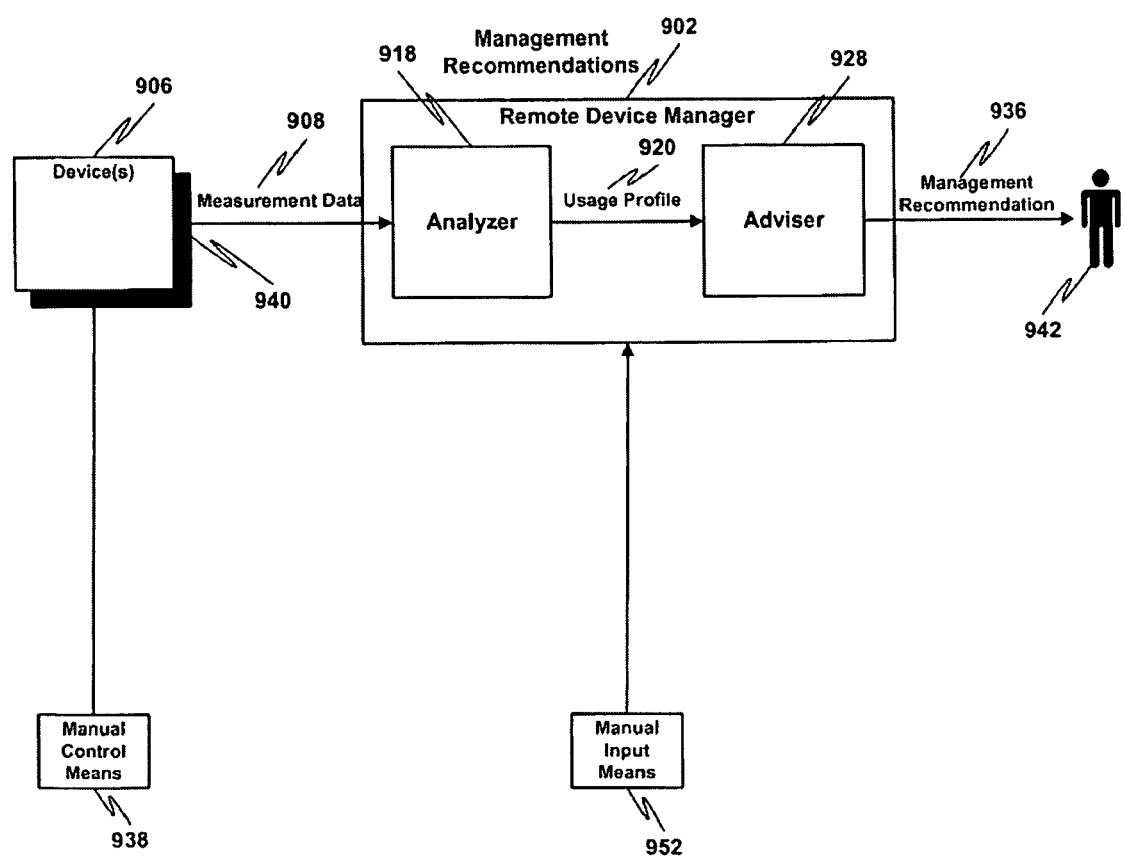
FIG. 9 is a high level block diagram that illustrates a system for issuing one or more management recommendations based at least in part on device measurement data obtained from one or more devices in accordance with one embodiment of the present invention.
Figure 10:
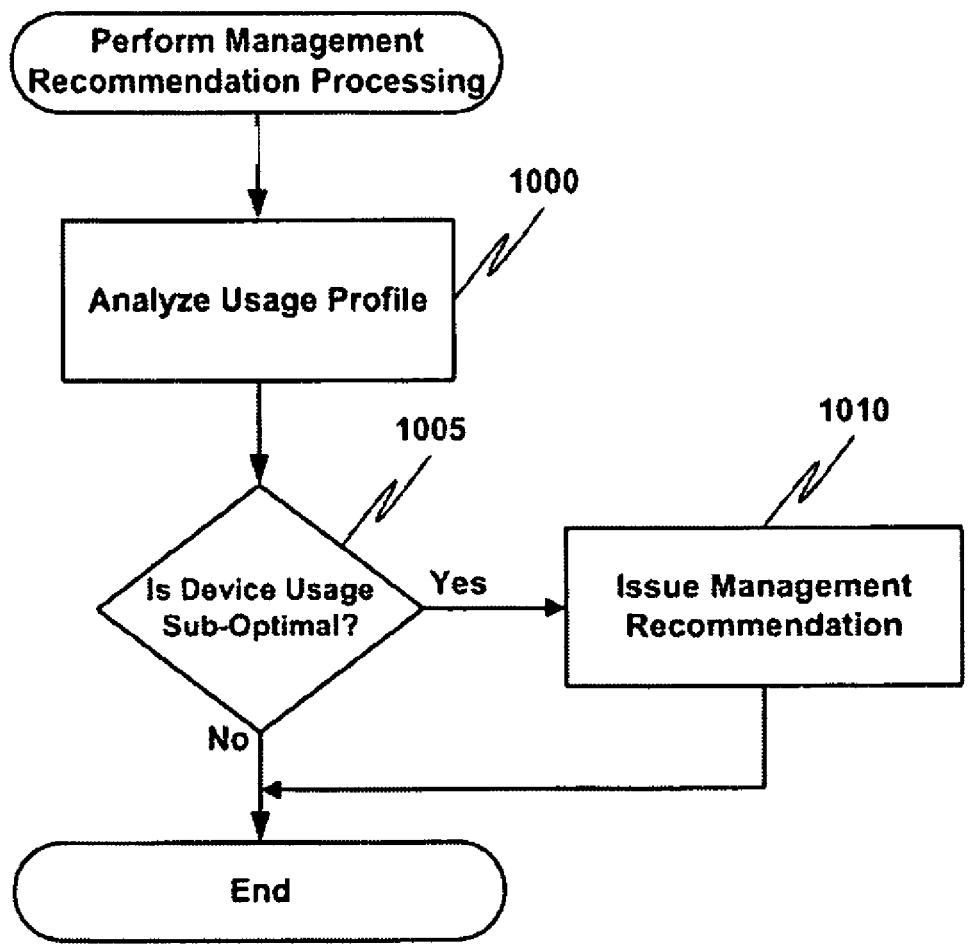
FIG. 10 is a high level control flow diagram that illustrates issuing one or more management recommendations based at least in part on device measurement data obtained from one or more devices in accordance with one embodiment of the present invention.
Figure 11:
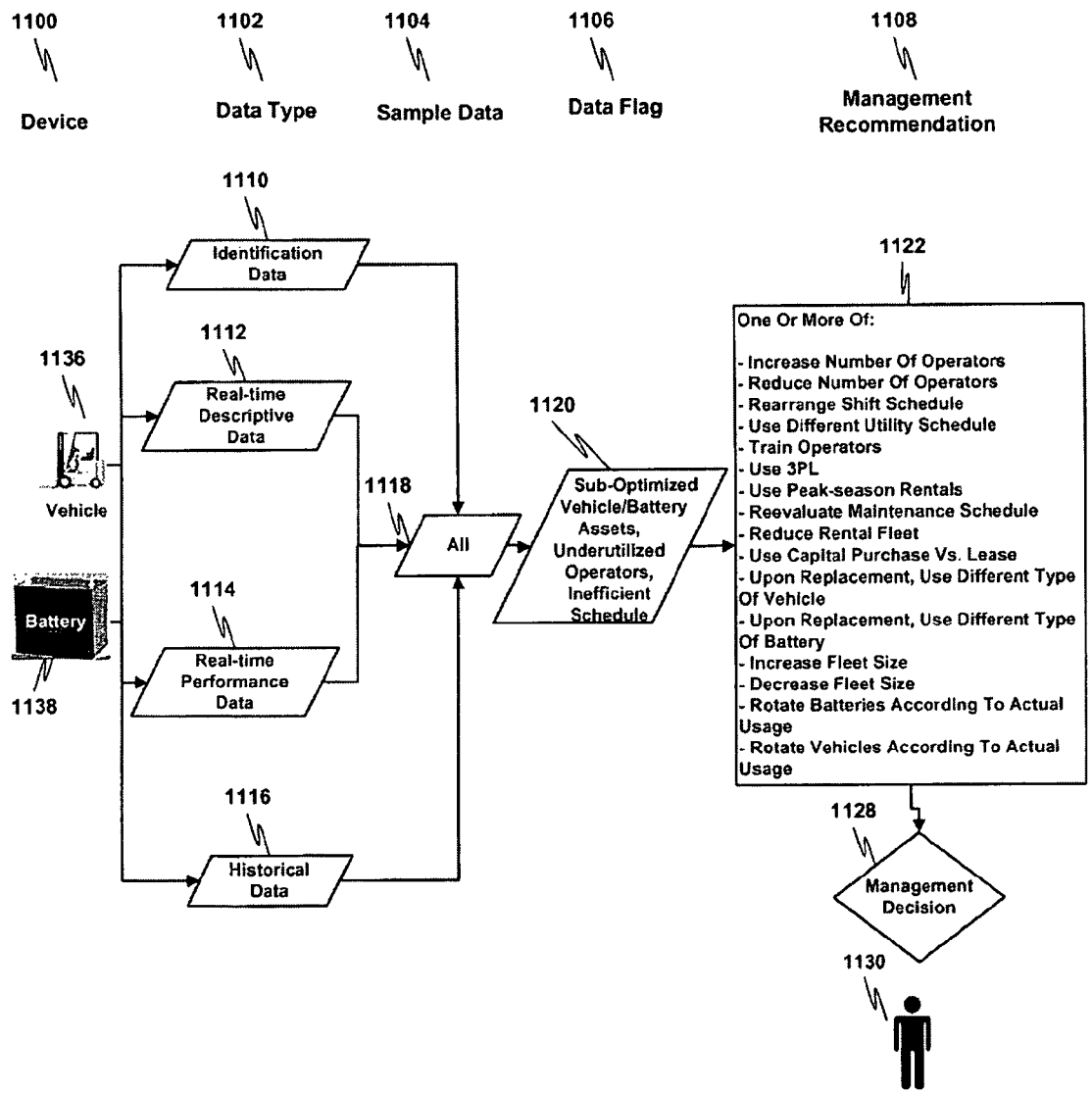
FIG. 11 is a low level data flow diagram that illustrates issuing one or more management recommendations based at least in part on device measurement data obtained from one or more vehicles and from one or more batteries associated with the one or more vehicles in accordance with one embodiment of the present invention.
Figure 12:
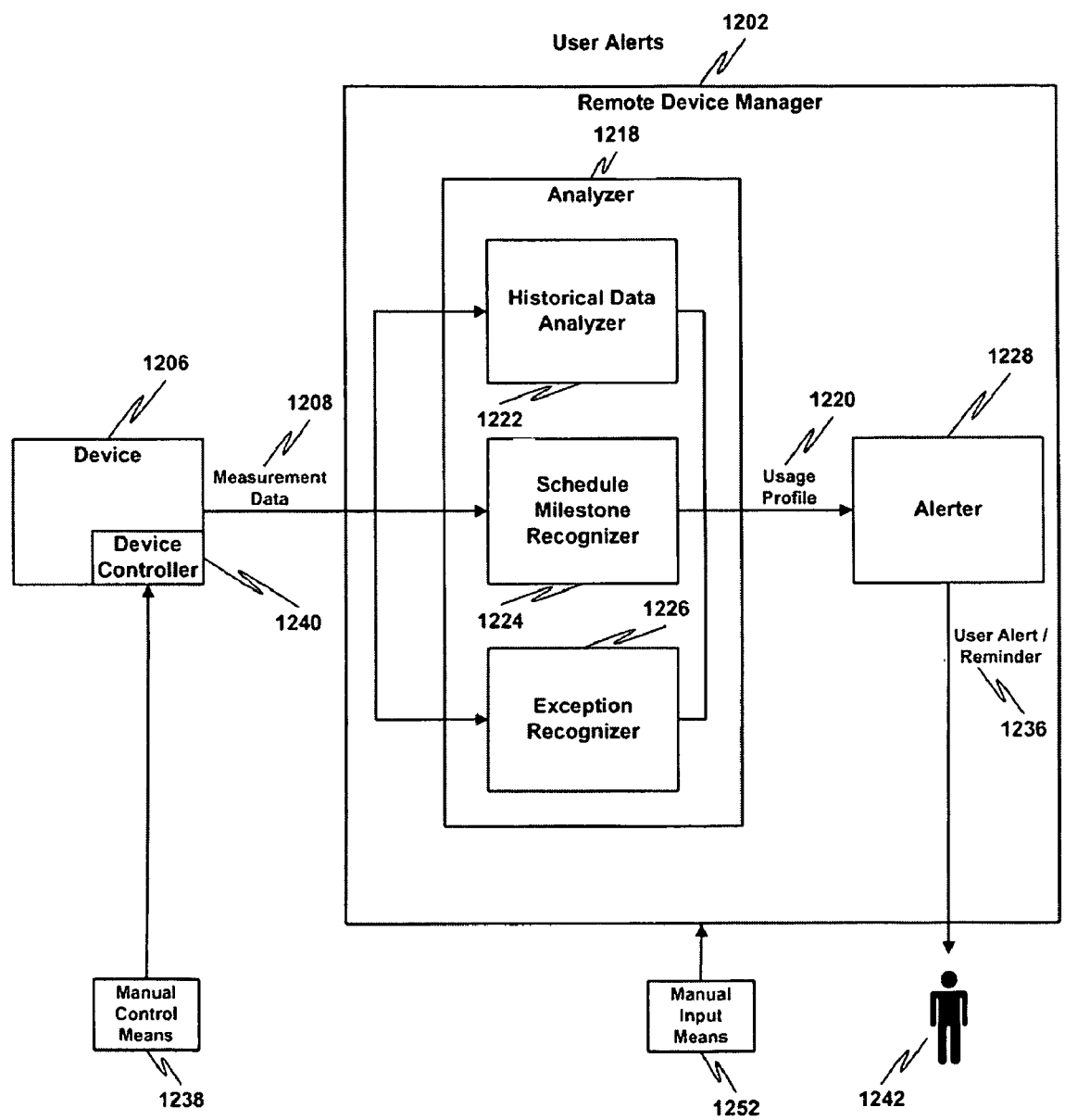
FIG. 12 is a high level block diagram that illustrates a system for issuing one or more user alerts based at least in part on device measurement data obtained from one or more devices in accordance with one embodiment of the present invention.
Figure 13:
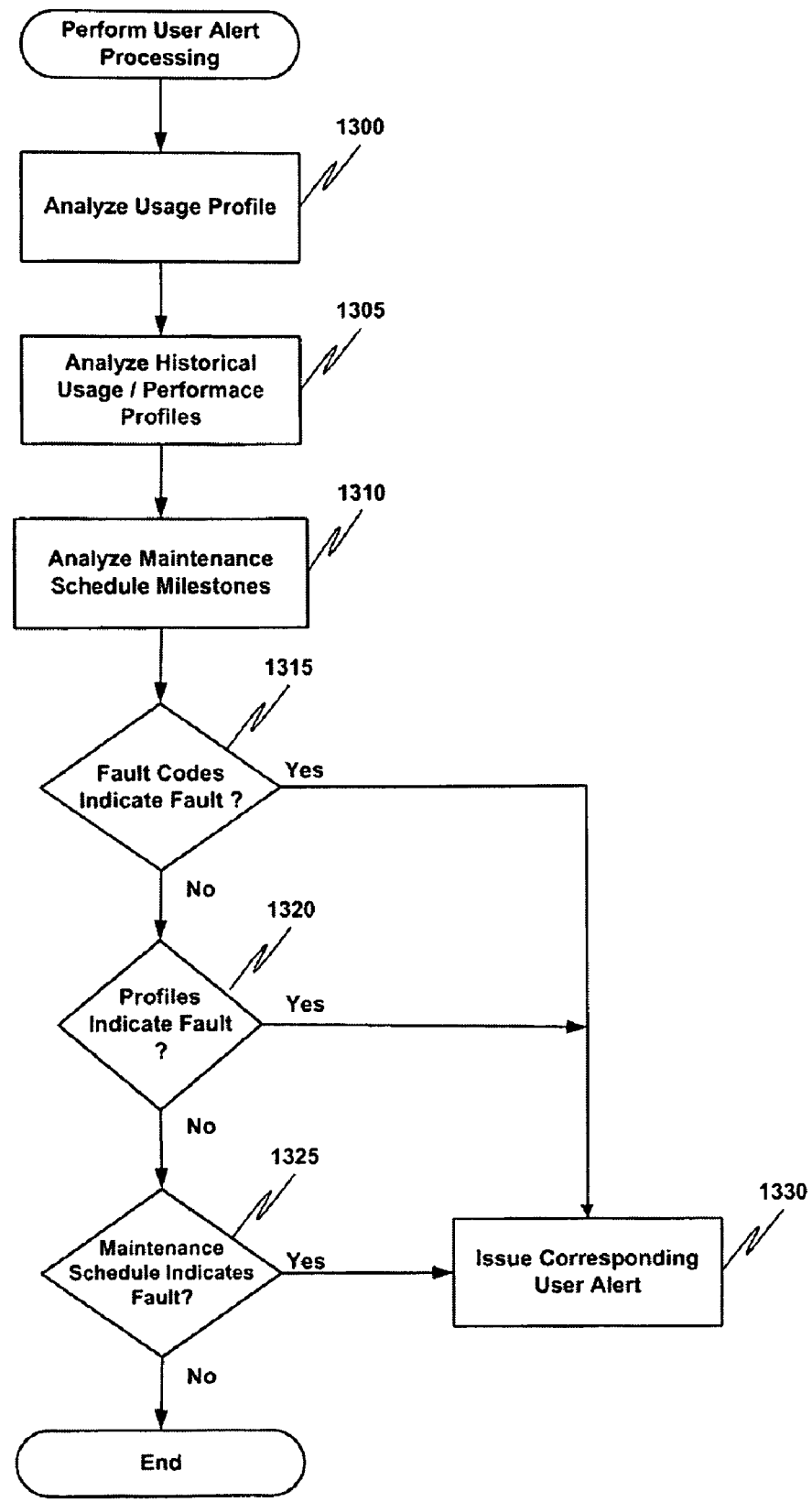
FIG. 13 is a high level control flow diagram that illustrates issuing one or more user alerts based at least in part on device measurement data obtained from one or more devices in accordance with one embodiment of the present invention.
Figure 14:
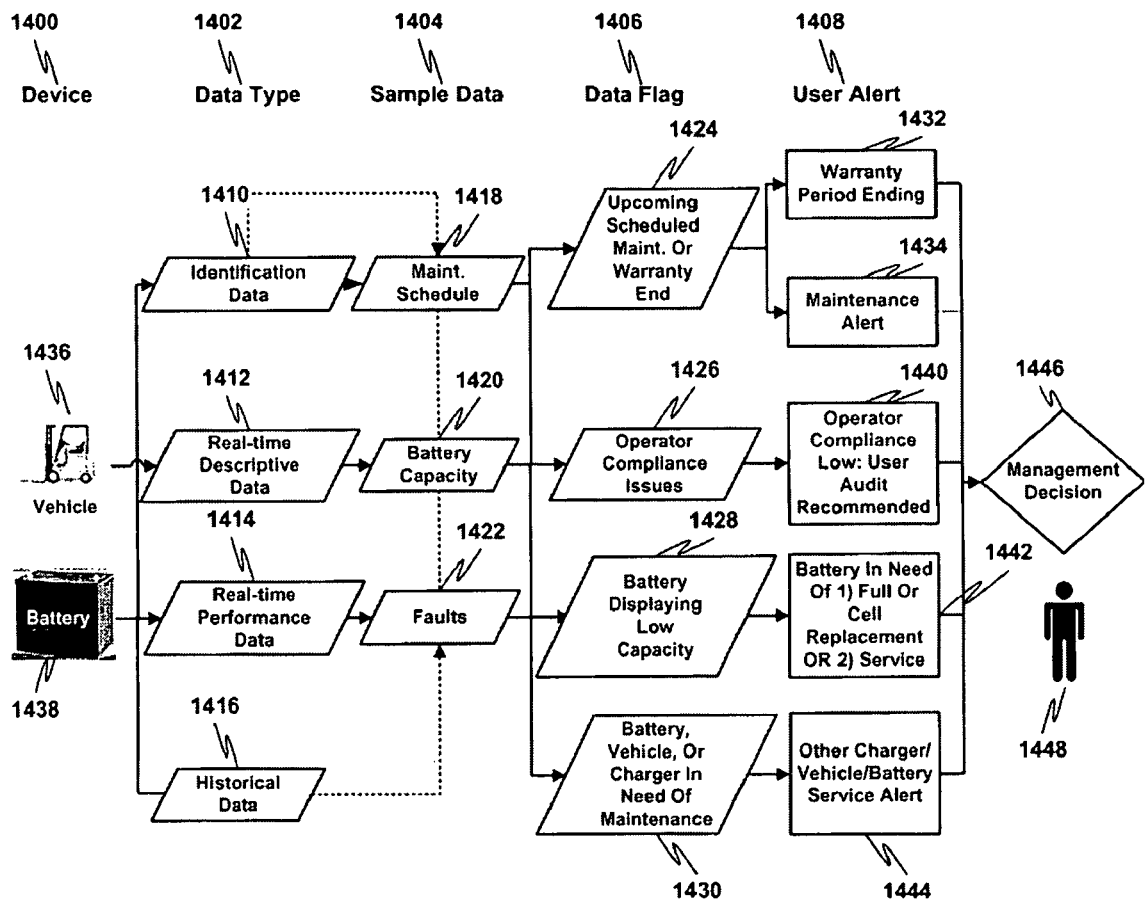
FIG. 14 is a low level data flow diagram that illustrates issuing one or more user alerts based at least in part on device measurement data obtained from one or more vehicles and from one or more batteries associated with the one or more vehicles in accordance with one embodiment of the present invention.

FIGS. 5-14 illustrate more detail for an automatic controller, an advisor, and an alerter in accordance with embodiments of the present invention. FIGS. 5-8 illustrate an automatic controller, FIGS. 9-11 illustrate an advisor, and FIGS. 12-14 illustrate an alerter.

Figure 5:
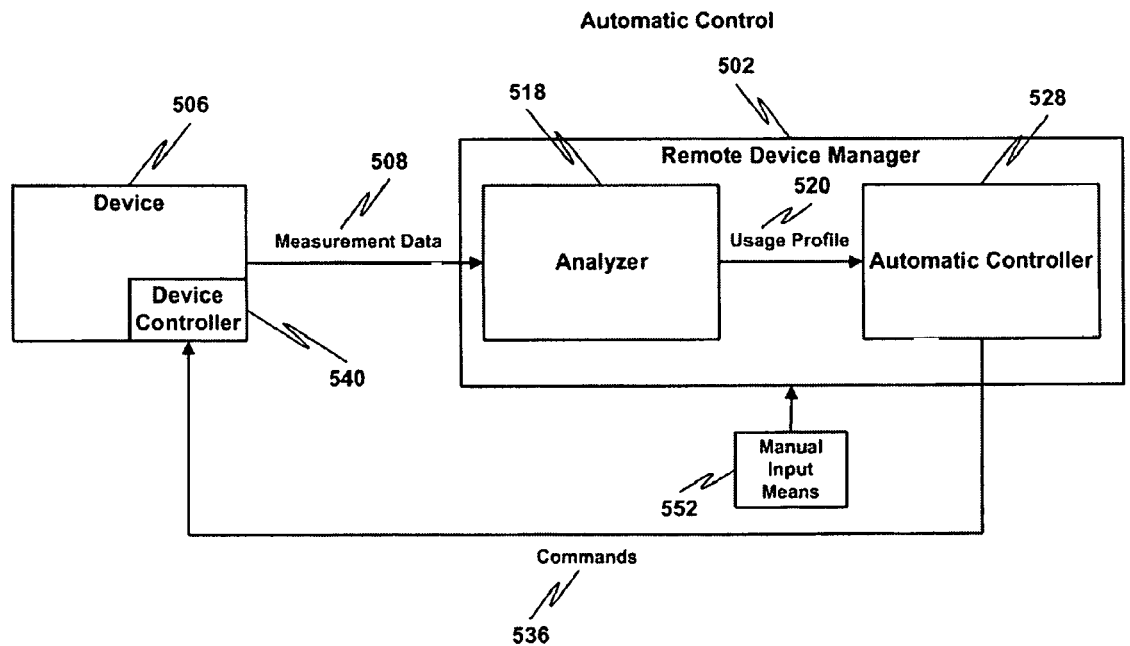
FIG. 5 is a high level block diagram that illustrates a system for automatic control of one or more devices based at least in part on device measurement data obtained from the one or more devices in accordance with one embodiment of the present invention.

Turning now to FIG. 5, a high level block diagram that illustrates a system for automatic control of one or more devices based at least in part on device measurement data obtained from the one or more devices in accordance with one embodiment of the present invention is presented. As shown in FIG. 5, device 506 comprises a local device controller 540 adapted to control the one or more devices 506 based at least in part on one or more commands from automatic controller 528. According to one embodiment of the present invention, device 506 and remote device controller 502 are operatively coupled via a dedicated communication means. According to another embodiment of the present invention, device 506 and remote device manager 502 are operatively coupled via a network (not shown in FIG. 5). Remote device manager 502 comprises an analyzer 518 and an automatic controller 528. Analyzer 518 is adapted to update one or more usage profiles 520 based at least in part on one or more of the identification data, the historical data, and the real-time data that comprises the device measurement data 508.

The one or more usage profiles 520 comprise information regarding the use of the one or more devices 506. The one or more usage profiles 520 may be stored in a memory associated with the remote device manager 502.

Automatic controller 528 is adapted to automatically control attributes or operations of the one or more devices 506 based at least in part on the device measurement data 508 obtained from the one or more devices 506 by issuing one or more commands 536 to the one or more devices 506.

In operation, device measurement data 508 is transferred from device 506 to remote device manager 502. According to one embodiment of the present invention, the transfer is initiated by the one or more devices 506. According to another embodiment of the present invention, the transfer is initiated by the remote device manager 502. Analyzer 518 updates one or more usage profiles 520 based at least in part on one or more of the identification data, the historical data, and the real-time data that comprises the device measurement data 508. Automatic controller 528 automatically controls attributes or operations of the one or more devices 506 based at least in part on the device measurement data 508 obtained from the one or more devices 506 by issuing one or more commands 536 to the one or more devices 506.

Figure 6:
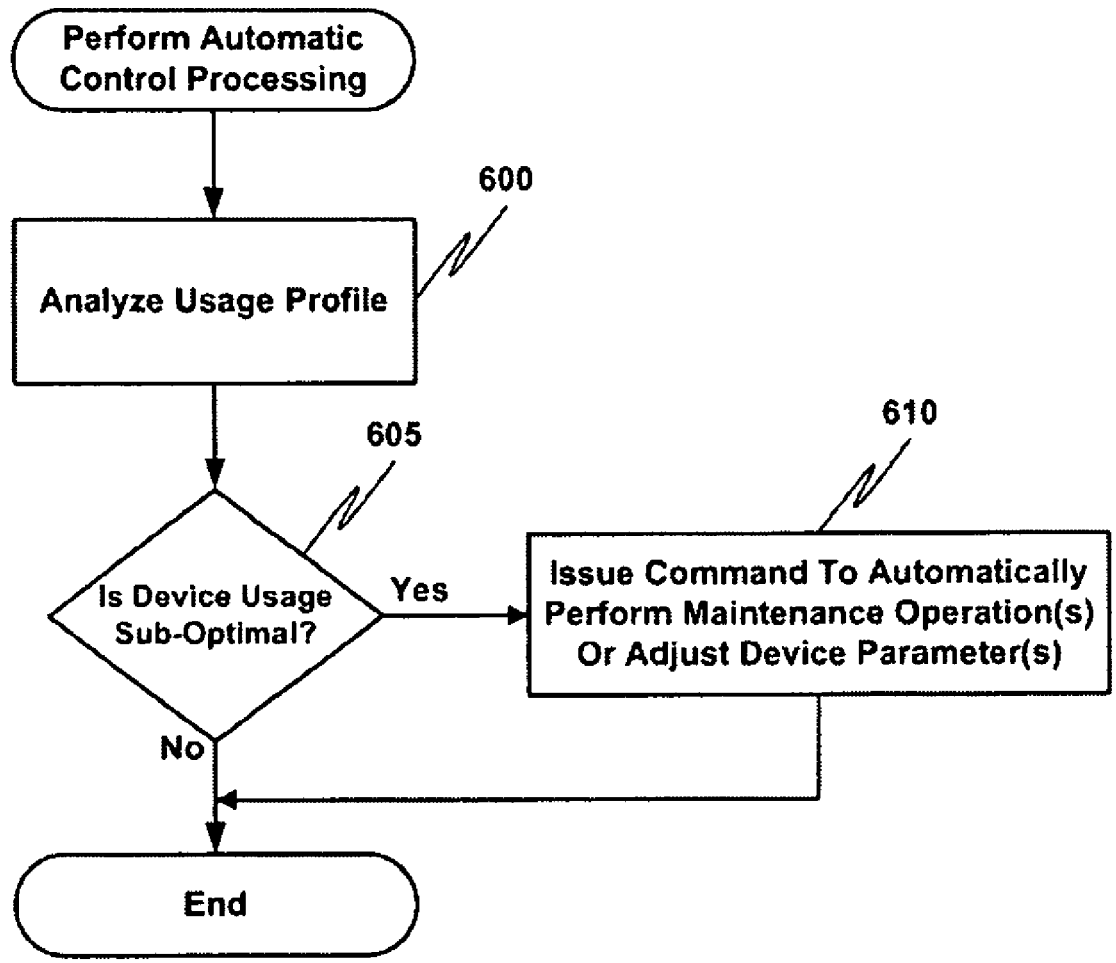
FIG. 6 is a high level control flow diagram that illustrates automatic control of one or more devices based at least in part on device measurement data obtained from the one or more devices in accordance with one embodiment of the present invention.

Turning now to FIG. 6, a high level control flow diagram that illustrates automatic control of one or more devices based at least in part on device measurement data obtained from the one or more devices in accordance with one embodiment of the present invention is presented. FIG. 6 corresponds with FIG. 5 and provides more detail for reference numeral 4A20 of FIG. 4A. The processes illustrated in FIG. 6 may be implemented in hardware, software, firmware, or a combination thereof. At 600, a usage profile corresponding to a device is analyzed. At 605, a determination is made regarding whether the device usage is sub-optimal. If the device usage is sub-optimal, at 610 a command is issued to automatically perform one or more maintenance operations, or to adjust one or more device parameters. Alternatively, the remote device manager stores the command and the one or more devices are adapted to query the remote device manager for the command.

According to one embodiment of the present invention, process 610 comprises adjusting one or more charge rates. According to another embodiment of the present invention, process 610 comprises adjusting a battery monitor identification (BMID) device to optimize charging rates. According to another embodiment of the present invention, process 610 comprises watering a battery. According to another embodiment of the present invention, process 610 comprises unscheduled battery equalization.

According to another embodiment of the present invention, process 610 comprises adjusting one or more vehicle performance levels. By way of example, process 610 may comprise adjusting one or more of the vehicle traction acceleration, the vehicle speed, and if the vehicle is a fork lift, the vehicle lift rate and the vehicle lift lockout.

Figure 7:
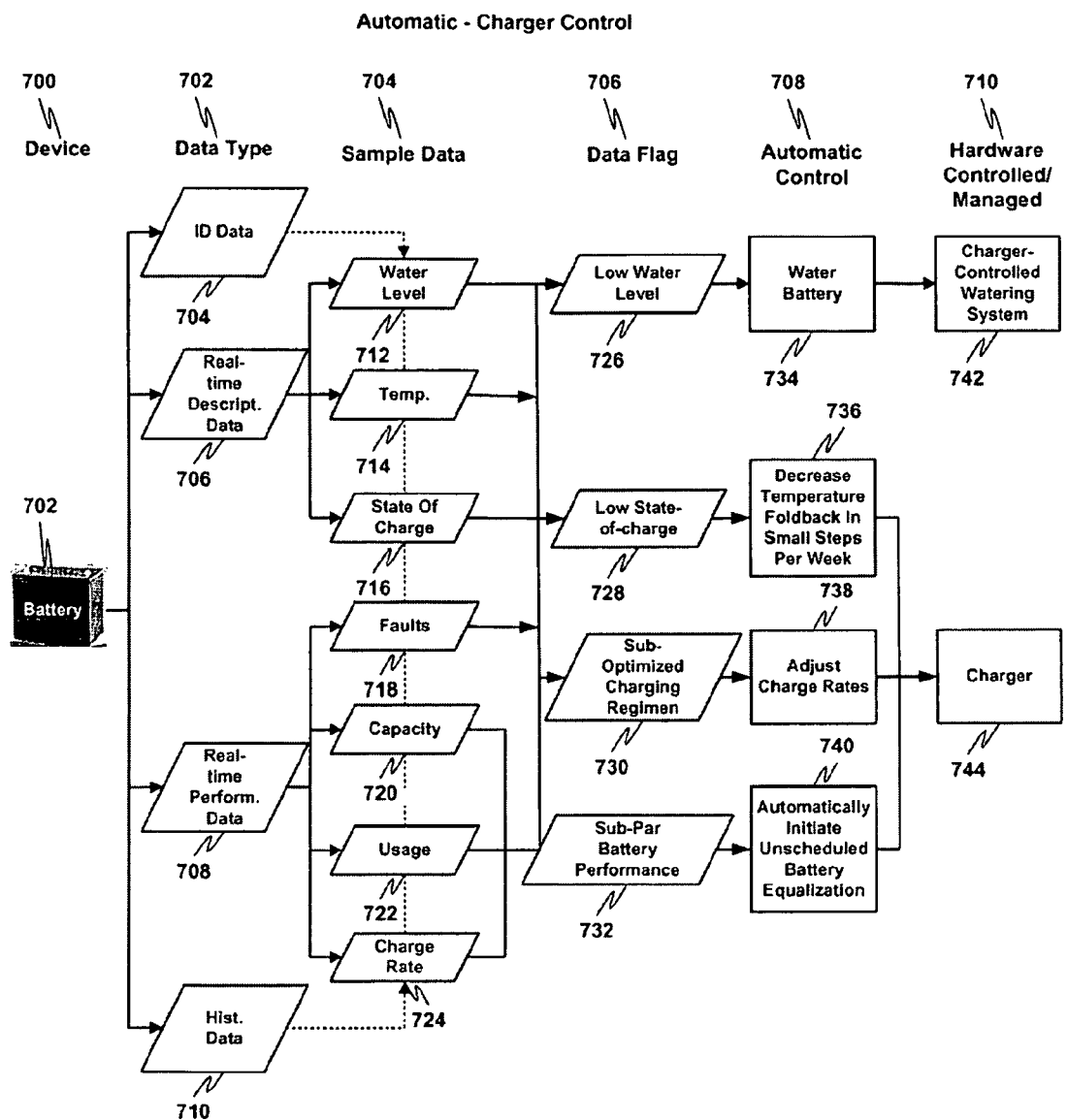
FIG. 7 is a data flow diagram that illustrates automatic control of one or more chargers based at least in part on device measurement data obtained from one or more batteries in accordance with one embodiment of the present invention.
Figure 8:
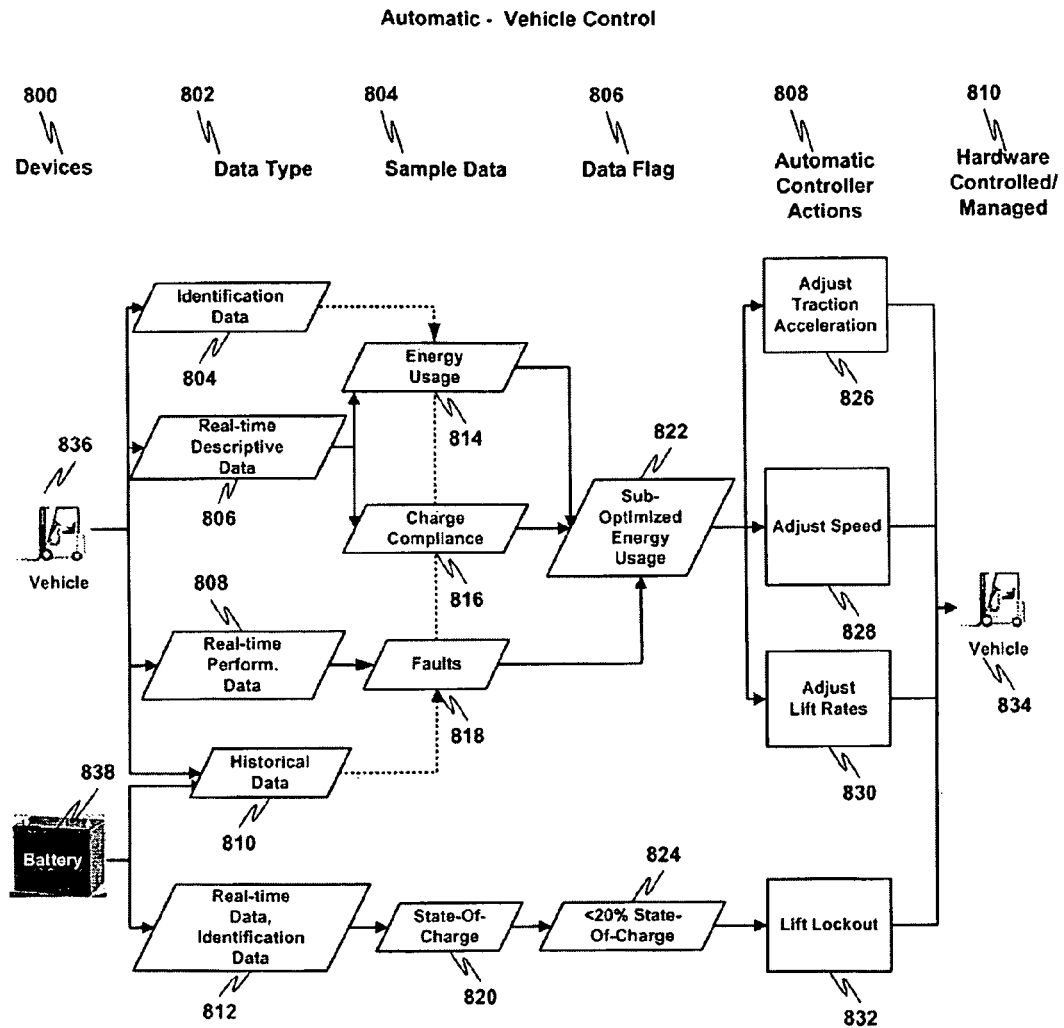
FIG. 8 is a data flow diagram that illustrates automatic control of one or more vehicles based at least in part on device measurement data obtained from the one or more vehicles and from one or more batteries associated with the one or more vehicles in accordance with one embodiment of the present invention.

Turning now to FIG. 7, a data flow diagram that illustrates automatic control of one or more chargers based at least in part on device measurement data obtained from one or more batteries in accordance with one embodiment of the present invention is presented. As shown in column 702, the types of data used for automatic control of chargers comprise identification data 704, real-time descriptive data 706, real-time performance data 708, and historical data 710. As shown in column 704, exemplary descriptive data 706 comprises battery water level 712, battery temperature 714, and battery state-of-charge 716. Additionally, exemplary real-time performance data comprises battery faults 718, battery capacity 720, battery usage 722, and battery charge rate 724. Exemplary battery fault information is presented in Table 4, below. The battery fault information listed in Table 4 is illustrative and is not intended to be an exhaustive list. Those of ordinary skill in the art will recognize that other battery fault information may be used. Column 706 illustrates information derivable from the sample data in column 704. A low water level condition 726 is indicated if the battery water level 712 falls below a predetermined water level. A low state-of-charge condition 728 is indicated if the battery state-of-charge falls below a predetermined state-of-charge level. A sub-optimized charging regimen 730 or a sub-par battery performance 732 may also be indicated based at least in part on device measurement data obtained from the battery 702.

TABLE 4

| Fault Event Information |
|---|
| Charger Identifier |
| Charge Port |
| Fault Start Date |
| Fault Start Time |
| Fault End Date |
| Fault End Time |
| Fault Code |
| Fault Information |

Charge Event Data is a type of real-time data. Exemplary real-time data is listed in Table 5, below. The charge event data listed in Table 5 is illustrative and is not intended to be an exhaustive list. Those of ordinary skill in the art will recognize that other charge event data may be used.

TABLE 5

| Charge Event Data |
|---|
| Charger Identifier |
| Charge Port |
| Charge Start Date |
| Charge Start Time |
| Charge End Date |
| Charge End Time |
| Charge Time |
| Charge Ahs |
| Charge KWhs |
| Charge Start Temperature |
| Charge End Temperature |
| Charge Start State-Of-Charge |
| Charge End State-Of-Charge |
| Charge Start Voltage |
| Charge End Voltage |
| Charge Start Current |
| Charge End Current |
| Charge Type |
| Charge Start Code |
| Charge Term Code |

Exemplary battery charge parameters are listed in Table 6, below. The battery charge parameters listed in Table 6 is illustrative and is not intended to be an exhaustive list. Those of ordinary skill in the art will recognize that other battery charge parameters may be used.

TABLE 6

Battery Charge Parameters

Battery Identifier
Truck Identifier
Battery Type
Number of Cells
Battery Capacity
Start Current Limit
FC State-Of-Charge Limit
Maximum Ahs between
Maximum Days Between Equalizations
Equalization day of week
Internal Resistance
Target Voltage Limit
Temperature Fold back Coefficient Column 708 illustrates exemplary automatic control measures that may be initiated based at least in part on the indicators in column 706. In more detail, a low water level indication triggers a command to a watering system 742 that effectuates automatic watering of the battery 702. A low battery state-of-charge triggers a reduction of temperature fold back in small steps per week 736. A sub-optimized charging regimen 730 triggers an adjustment of the charge rates. Sub-par battery performance 732 triggers initiation of unscheduled battery equalization Turning now to FIG. 8, a data flow diagram that illustrates automatic control of one or more vehicles based at least in part on device measurement data obtained from the one or more vehicles and from one or more batteries associated with the one or more vehicles in accordance with one embodiment of the present invention is presented. As shown in column 802, the types of data used for automatic control of the one or more vehicles comprises vehicle identification data 804, vehicle real-time descriptive data 806, vehicle real-time performance data 808, vehicle and battery historical data 810, and battery real-time descriptive data, identification data, and real-time performance data 812. As shown in column 804, exemplary vehicle real-time descriptive data 806 comprises energy usage 814 and charge compliance 816. Additionally, exemplary vehicle real-time performance data comprises faults 818. Exemplary battery real-time performance data comprises the battery state of charge 820. Column 806 illustrates information derivable from the sample data in column 804. Energy usage data 814, charge compliance data 816, and fault data 818 may be used to determine whether the vehicle energy usage is sub-optimal 822. An indication 824 is also made if the battery state of charge 820 is less than a predetermined amount. As shown in column 808, exemplary automatic vehicle control actions comprise adjusting the vehicle traction acceleration 826, adjusting the vehicle speed 828, or adjusting the vehicle lift rates 830 (if the vehicle comprises a fork lift) when the vehicle energy usage is sub-optimal. Exemplary vehicle control actions also comprise performing a lift lockout 832 when the battery state of charge is less than a predetermined amount 824.

Column 808 illustrates exemplary automatic control measures that may be initiated based at least in part on the indicators in column 806. In more detail, a low water level indication triggers a command to a watering system 842 that effectuates automatic watering of the battery 802. A low battery state-of-charge triggers a reduction of temperature fold back in small steps per week 836. A sub-optimized charging regimen 830 triggers an adjustment of the charge rates. Sub-par battery performance 832 triggers initiation of unscheduled battery equalization Turning now to FIG. 9, a high level block diagram that illustrates a system for issuing one or more management recommendations based at least in part on device measurement data obtained from one or more devices in accordance with one embodiment of the present invention is presented. As shown in FIG. 9, one or more devices 906 comprises a local device controller 940 adapted to control the one or more devices 906 based at least in part on one or more commands from manual control means 938. According to one embodiment of the present invention, one or more devices 906 and remote device controller 902 are operatively coupled via a dedicated communication means. According to another embodiment of the present invention, the one or more devices 906 and remote device manager 902 are operatively coupled via a network (not shown in FIG. 9).

Still referring to FIG. 9, remote device manager 902 comprises an analyzer 918 and an adviser 928. Analyzer 918 is adapted to update one or more usage profiles 920 based at least in part on one or more of the identification data, the historical data, and the real-time data that comprises the device measurement data 908.

The one or more usage profiles 920 comprise information regarding the use of the one or more devices 906. The one or more usage profiles 920 may be stored in a memory associated with the remote device manager 902.

Adviser 928 is adapted to issue one or more management recommendations to a user 942, based at least in part on the device measurement data 908 obtained from the one or more devices 906.

In operation, device measurement data 908 is transferred from the one or more devices 906 to remote device manager 902. According to one embodiment of the present invention, the transfer is initiated by the one or more devices 906. According to another embodiment of the present invention, the transfer is initiated by the remote device manager 902. Analyzer 918 updates one or more usage profiles 920 based at least in part on one or more of the identification data, the historical data, and the real-time data that comprises the device measurement data 908. Advisor 928 issues one or more management recommendations 936 to a user 942, based at least in part on the device measurement data 908 obtained from the one or more devices 906.

Turning now to FIG. 10, a high level control flow diagram that illustrates issuing one or more management recommendations based at least in part on device measurement data obtained from one or more devices in accordance with one embodiment of the present invention is presented. FIG. 10 corresponds with FIG. 9 and provides more detail for reference numeral 4A30 of FIG. 4A. The processes illustrated in FIG. 10 may be implemented in hardware, software, firmware, or a combination thereof. At 1000, a usage profile corresponding to a device is analyzed to provide recommendations with respect to management of the particular device, as well as other assets. The usage profile comprises performance data of the device gathered over a period of time. At 1005, a determination is made regarding whether the device usage is sub-optimal. If the device usage is sub-optimal, at 1010 a management recommendation is issued.

According to one embodiment of the present invention, a management recommendation comprises an asset rotation recommendation. The asset rotation recommendation may be based at least in part on the capabilities of a device and the workload of the device with respect to capabilities and workloads of other devices.

According to another embodiment of the present invention, a management recommendation comprises an asset reduction recommendation. According to another embodiment of the present invention, a management recommendation comprises an asset addition recommendation. The asset reduction recommendation and the asset addition recommendation may be based at least in part on the capabilities of fleet devices and the workload of the fleet devices.

A management recommendation may be delivered to the user 942 many ways. According to one embodiment of the present invention, a management recommendation is delivered to user 942 via a phone call. By way of example, the phone number of a phone associated with user 942 is dialed and when the phone is answered, an audio message regarding the management recommendation is played for user 942 to hear. According to one embodiment of the present invention, a management recommendation is delivered to user 942 via a pager. By way of example, a text message regarding the management recommendation is sent to the pager number of a pager associated with user 942. According to one embodiment of the present invention, a management recommendation is delivered to user 942 via an email message. By way of example, a text message comprising a management recommendation, or a Universal Resource Locator (URL) that references a management recommendation, is delivered in an email message to an email address associated with user 942. According to one embodiment of the present invention, a management recommendation is delivered to user 942 via a message on a display screen. By way of example, a management recommendation is rendered on a display screen associated with user 942. According to one embodiment of the present invention, a management recommendation is delivered to user 942 via an alarm. By way of example, an audio message regarding the management recommendation may be played over a public address system of a facility associated with the user 942. As another example, an audio message or an audio-video message regarding the management recommendation may be played on a computing device adapted to render audio messages and associated with the user 942. The audio or audio-video message may comprise one or more of a verbal message and a nonverbal message (e.g. one or more "beeps" or other sounds associated with a particular management recommendation). According to another embodiment of the present invention, a management recommendation comprises two or more of the types of management recommendations mentioned above.

Turning now to FIG. 11, a low level data flow diagram that illustrates issuing one or more management recommendations based at least in part on device measurement data obtained from one or more vehicles and from one or more batteries associated with the one or more vehicles in accordance with one embodiment of the present invention is presented. As shown in column 1102, the types of data used for issuing one or more management recommendations comprises vehicle and battery identification data 1104, vehicle and battery real-time descriptive data 1112, vehicle and battery real-time performance data 1114, and vehicle and battery historical data 1116. Column 1106 illustrates information derivable from the sample data in column 1102. The data 1118 may be used to determine whether there is sub-optimal usage of vehicle assets, battery assets, or both, whether one or more operators are underutilized, and whether a schedule is inefficient 1120. As shown in column 1108, exemplary management recommendations comprise one or more of recommendations for increasing the number of operators, reducing the number of operators, rearranging the shift schedule, using a different utility schedule, training operators, using 3PL, using peak-season rentals, reevaluating maintenance schedules, reducing the rental fleet, using a capital purchase instead of leasing, leasing instead of using a capital purchase, use different type of vehicle when a vehicle needs to be replaced, using a different type of battery when a battery needs to be replaced, increasing the fleet size, decreasing the fleet size, and rotating batteries or vehicles according to actual usage 1122. The management recommendation 1108 is presented to a user 1130 who is free to make a management decision 1128 based at least in part on the management recommendation 1108.

The management recommendations listed at 1122 are illustrative and are not intended to be an exhaustive list. Those of ordinary skill in the art will recognize that other management recommendations may be used.

Turning now to FIG. 12, a high level block diagram that illustrates a system for issuing one or more user alerts based at least in part on device measurement data obtained from one or more devices in accordance with one embodiment of the present invention is presented. As shown in FIG. 12, device 1206 comprises a local device controller 1240 adapted to control the one or more devices 1206 based at least in part on one or more commands from manual control means 1238. According to one embodiment of the present invention, device 1206 and remote device controller 1202 are operatively coupled via a dedicated communication means. According to another embodiment of the present invention, device 1206 and remote device manager 1202 are operatively coupled via a network (not shown in FIG. 12).

Still referring to FIG. 12, remote device manager 1202 comprises an analyzer 1218 and an alerter 1228. Analyzer 1218 is adapted to update one or more usage profiles 1220 based at least in part on one or more of the identification data, the historical data, and the real-time data that comprises the device measurement data 1208.

The one or more usage profiles 1220 comprise information regarding the use of the one or more devices 1206. The one or more usage profiles 1220 may be stored in a memory associated with the remote device manager 1202.

Analyzer 1218 comprises one or more of a historical data analyzer 1222, a schedule milestone recognizer 1224, and an exception recognizer 1226. Historical data analyzer 1222 is adapted to analyze historical data, schedule milestone recognizer is adapted to analyze schedule milestones, and exception recognizer 1226 is adapted to recognize exceptions. Alerter 1224 is adapted to issue one or more user alerts to the user 1242, based at least in part on the device measurement data 1208 obtained from the one or more devices 1206. Manual control means 1238 may be used by user 1242 to control the one or more devices 1206 based at least in part on one or more user alerts received from alerter 224. Manual control means 1238 comprises an input device, such as alphanumeric keyboard 118, numeric keyboard 118, joystick 116, roller 114, directional navigation pad 126, or display screen 110 of FIG. 1.

In operation, device measurement data 1208 is transferred from device 1206 to remote device manager 1202. According to one embodiment of the present invention, the transfer is initiated by the one or more devices 1206. According to another embodiment of the present invention, the transfer is initiated by the remote device manager 1202. Analyzer 1218 updates one or more usage profiles 1220 based at least in part on one or more of the identification data, the historical data, and the real-time data that comprise the device measurement data 1208. Historical data analyzer 1222 of analyzer 1218 analyzes historical data. Schedule milestone recognizer 1224 of analyzer 1218 analyzes schedule milestones. Exception recognizer 1226 of analyzer 1218 analyzes exceptions. Alerter 1228 issues one or more user alerts to the user 1242, based at least in part on the one or more usage profiles 1220.

Turning now to FIG. 13, a high level control flow diagram that illustrates issuing one or more user alerts based at least in part on device measurement data obtained from one or more devices in accordance with one embodiment of the present invention is presented. FIG. 13 corresponds with FIG. 12 and provides more detail for reference numeral 4A40 of FIG. 4A. The processes illustrated in FIG. 3 may be implemented in hardware, software, firmware, or a combination thereof. At 1300, a usage profile corresponding to a device is analyzed. At 1305, one or more historical usage or performance profiles associated with the one or more devices are analyzed. At 1310, one or more maintenance schedule milestones associate with the one or more devices are analyzed. At 1315, a determination is made regarding whether the fault codes indicate a fault. At 1320, a determination is made regarding whether the one or more profiles indicate a fault. At 1325, a determination is made regarding whether the maintenance schedule indicates a fault. If a fault is indicated at 1315, 1320, or 1325, a user alert corresponding to the particular fault is issued at 1330.

While the operations shown in FIG. 13 are illustrated in a specific order, other sequences of the operations are conceivable. For example, the order of processes 1300, 1305, and 1310 with respect to each other is not important. Additionally, the order of determinations 1315, 1320, and 1325 with respect to each other is not important.

According to one embodiment of the present invention, a user alert comprises a compliance alert. By way of example, if a user responsible for a particular vehicle charges the vehicle less frequently than suggested, a user alert informs the user of the non-compliance.

According to another embodiment of the present invention, a user alert comprises a warranty period ending alert. By way of example, if the warranty for a particular device will end within a predetermined amount of time, a user alert informs the user of this fact.

According to another embodiment of the present invention, a user alert comprises a non-warranty replacement alert.

According to another embodiment of the present invention, a user alert comprises a maintenance alert. By way of example, if the maintenance schedule of a device indicates maintenance should be performed and it has not yet been performed, a user alert informs the user of this fact.

According to another embodiment of the present invention, a user alert comprises a charger service alert. By way of example, if a charger requires unscheduled service, a user alert informs the user of this fact.

According to another embodiment of the present invention, a user alert comprises a vehicle service alert. By way of example, if a vehicle requires unscheduled service, a user alert informs the user of this fact.

According to another embodiment of the present invention, a user alert comprises a battery service alert. By way of example, if a battery requires unscheduled service, a user alert informs the user of this fact.

A user alert may be delivered to the user 1242 many ways. According to one embodiment of the present invention, a user alert is delivered to user 1242 via a phone call. By way of example, the phone number of a phone associated with user 1242 is dialed and when the phone is answered, an audio message regarding the user alert is played for user 1242 to hear. According to one embodiment of the present invention, a user alert is delivered to user 1242 via a pager. By way of example, a text message regarding the user alert is sent to the pager number of a pager associated with user 1242. According to one embodiment of the present invention, a user alert is delivered to user 1242 via an email message. By way of example, a text message comprising a user alert, or a Universal Resource Locator (URL) that references a user alert, is delivered in an email message to an email address associated with user 1242. According to one embodiment of the present invention, a user alert is delivered to user 1242 via a message on a display screen. By way of example, a user alert is rendered on a display screen associated with user 1242. According to one embodiment of the present invention, a user alert is delivered to user 1242 via an alarm. By way of example, an audio message regarding the user alert may be played over a public address system of a facility associated with the user 1242. As another example, an audio message or an audio-video message regarding the user alert may be played on a computing device adapted to render audio messages and associated with the user 1242. The audio or audio-video message may comprise one or more of a verbal message and a nonverbal message (e.g. one or more "beeps" or other sounds associated with a particular user alert). According to another embodiment of the present invention, a user alert comprises two or more of the types of user alerts mentioned above.

Turning now to FIG. 14, a low level data flow diagram that illustrates issuing one or more user alerts based at least in part on device measurement data obtained from one or more vehicles and from one or more batteries associated with the one or more vehicles in accordance with one embodiment of the present invention is presented. As shown in column 1402, the types of data used for issuing one or more user alerts comprises vehicle and battery identification data 1410, vehicle real-time descriptive data 1412, vehicle and battery real-time performance data 1414, and vehicle and battery historical data 1416. As shown in column 1404, exemplary identification data 1410 comprises a vehicle maintenance schedule 1418. Exemplary vehicle real-time descriptive data 1412 comprises battery capacity 1420. Exemplary vehicle and battery real-time performance data comprise faults. Column 1406 illustrates information derivable from the sample data in column 1404. The data 1404 may be used to determine whether the time for scheduled maintenance is near, whether a warranty period has ended 1424, whether operator compliance procedures are being followed 1426, whether a battery is displaying low capacity 1428, and whether a battery, vehicle, or charger requires maintenance 1430. As shown in column 1408, exemplary user alerts comprise indicating a warranty period is ending 1432, indicating maintenance is required 1434, indicating an operator is operating a vehicle in a non-compliant manner 1440, indicating a battery requires either (1) full or cell replacement, or (2) service 1442, and indicating another charger, vehicle, or battery service alert. The user alert 1404 is presented to a user 1448 who is free to make a management decision 1446 based at least in part on the user alert 1404.

Figure 15:
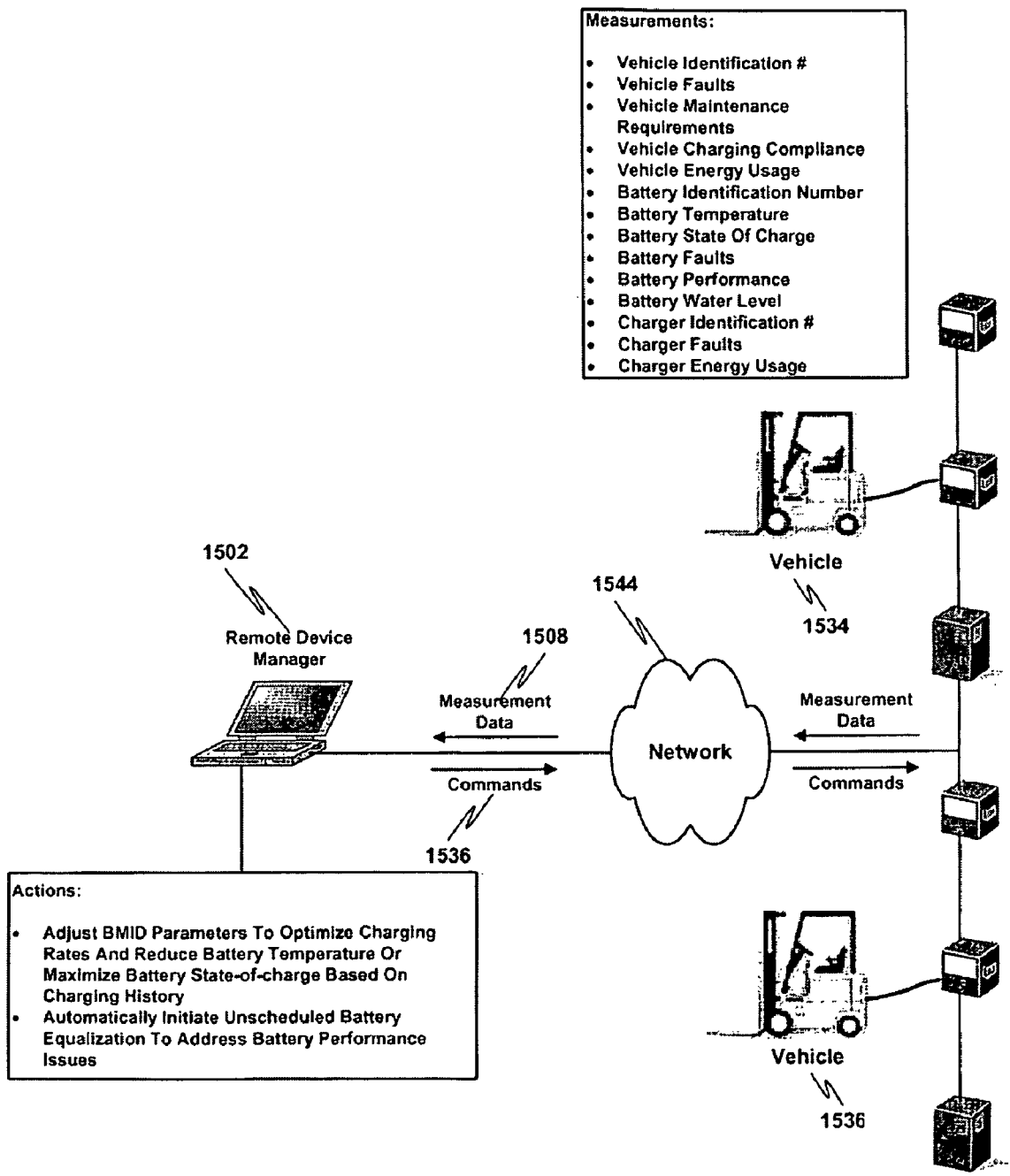
FIG. 15 is a block diagram that illustrates dynamic control of one or more chargers based at least in part on device measurement data collected from the one or more chargers and one or more vehicles associated with the one or more chargers in accordance with one embodiment of the present invention.
Figure 16:
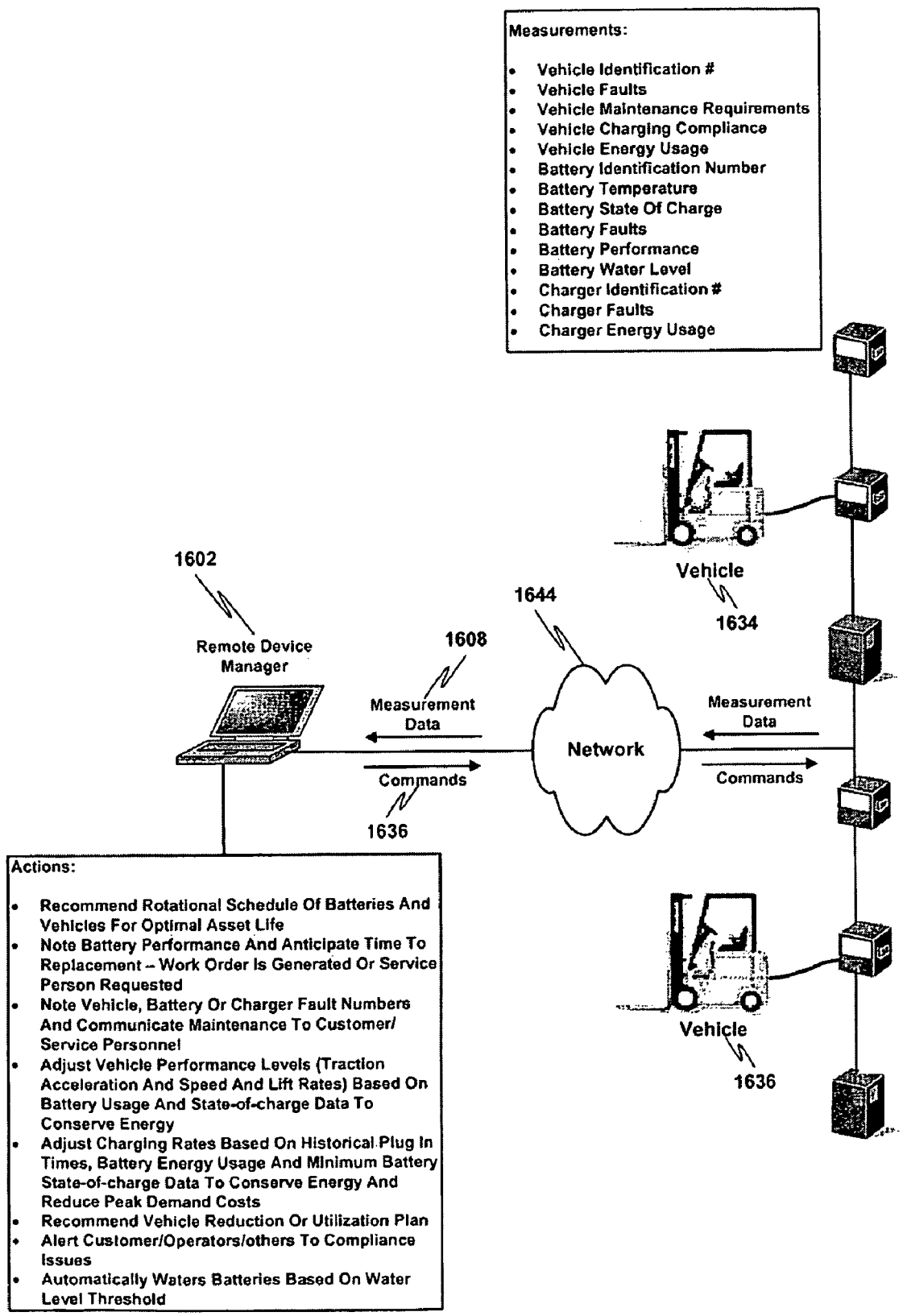
FIG. 16 is a block diagram that illustrates dynamic control of one or more chargers and one or more vehicles associated with the one or more chargers based at least in part on device measurement data collected from the one or more chargers and the one or more vehicles in accordance with one embodiment of the present invention.
Figure 17:
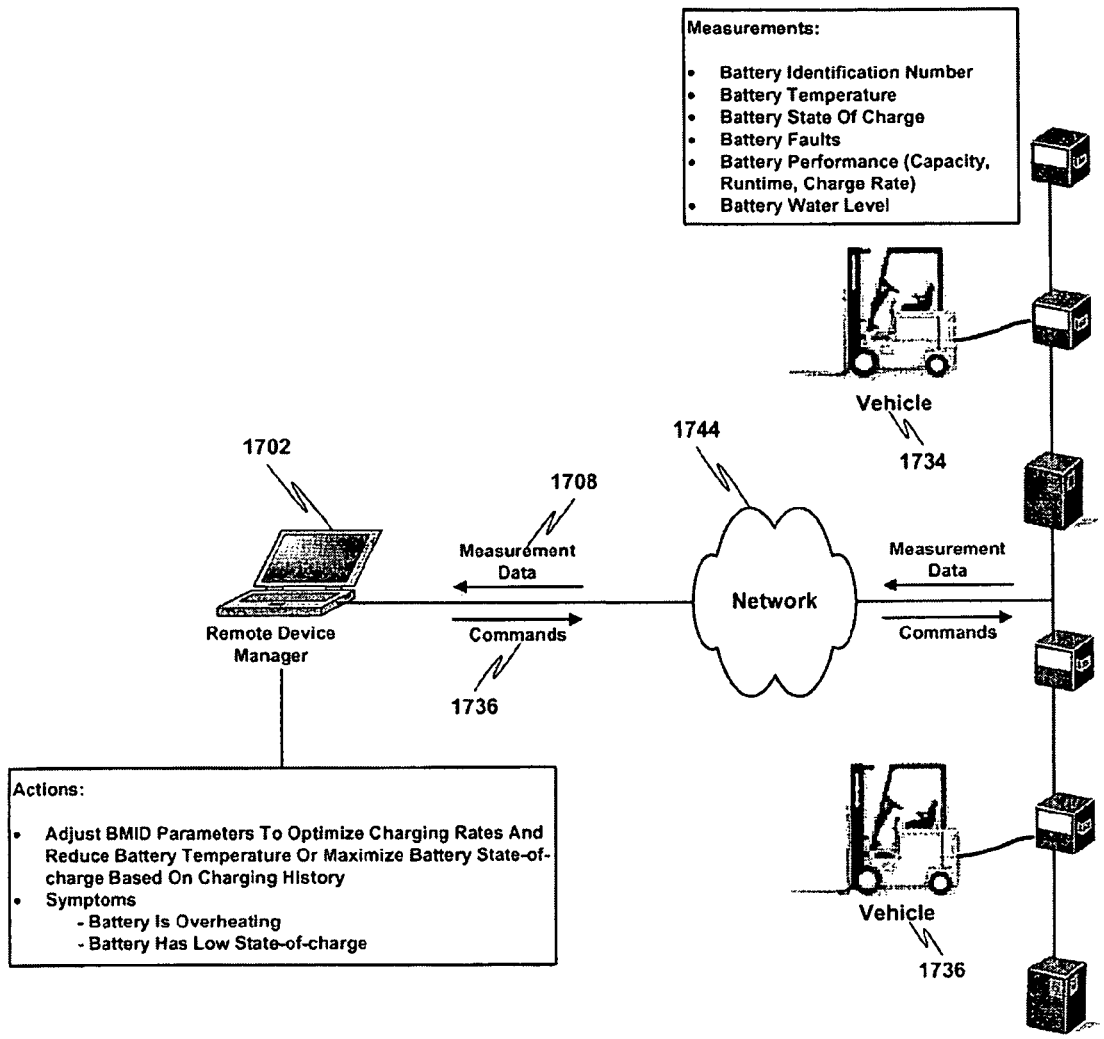
FIG. 17 is a block diagram that illustrates dynamic control of one or more chargers based at least in part on device measurement data collected from the one or more chargers an in accordance with one embodiment of the present invention.

FIGS. 15-17 illustrate dynamic control of one or more devices based at least in part on device measurement data collected from the one or more devices in accordance with embodiments of the present invention.

Turning now to FIG. 15, a block diagram that illustrates dynamic control of one or more chargers based at least in part on device measurement data collected from the one or more chargers and one or more vehicles associated with the one or more chargers in accordance with one embodiment of the present invention is presented. As shown in FIG. 15, multiple vehicles (1534, 1536) are operatively coupled to a remote device manager 1502 via a network 1544. The remote device manager 1502 receives device measurement data 1508 from the vehicles (1534, 1536) and the chargers associated with the vehicles (1534, 1536). The remote device manager 1502 analyzes the device measurement data 1508 and issues one or more commands based at least in part on the analysis. The BMID parameters may be adjusted to optimize charging rates and to reduce battery temperature. The BMID parameters may also be adjusted to maximize battery state-of-charge based at least in part on the charging history. Additionally or as an alternative thereto, unscheduled battery equalization may be initiated to address battery performance issues.

Turning now to FIG. 16, a block diagram that illustrates dynamic control of one or more chargers and one or more vehicles associated with the one or more chargers based at least in part on device measurement data collected from the one or more chargers and the one or more vehicles in accordance with one embodiment of the present invention is presented. As shown in FIG. 16, multiple vehicles (1634, 1636) are operatively coupled to a remote device manager 1602 via a network 1644. The remote device manager 1602 receives device measurement data 1608 from the vehicles (1634, 1636) and the chargers associated with the vehicles (1634, 1636). The remote device manager 1602 analyzes the device measurement data 1608 and issues one or more commands 1636 based at least in part on the analysis. A rotational schedule that maximizes asset life of batteries and vehicles may be recommended. A future asset replacement time may be anticipated based at least in part on battery performance. Vehicle, battery, or charger fault numbers may be recorded and communicated to customer support personnel. Vehicle performance levels may be adjusted to conserve energy, based at least in part on battery usage and state-of-charge data. Battery charging rates may be adjusted based at least in part on historical plug-in times, battery energy usage, and minimum battery state-of-charge data to conserve energy and reduce peak demand costs. A vehicle reduction recommendation or utilization plan may be presented. Customers, operators, or both, may be alerted with respect to compliance issues. Batteries may be automatically watered based at least in part on a water level threshold.

Turning now to FIG. 17, a block diagram that illustrates dynamic control of one or more chargers based at least in part on device measurement data collected from the one or more chargers an in accordance with one embodiment of the present invention is presented. As shown in FIG. 17, multiple vehicles (1734, 1736) are operatively coupled to a remote device manager 1702 via a network 1744. The remote device manager 1702 receives device measurement data 1708 from the vehicles (1734, 1736) and the chargers associated with the vehicles (1734, 1736). The remote device manager 1702 analyzes the device measurement data 1708 and issues one or more commands 1736 based at least in part on the analysis. The BMID parameters may be adjusted to optimize charging rates and to reduce battery temperature. The BMID parameters may also be adjusted to maximize battery state-of-charge based at least in part on the charging history.

Figure 18:
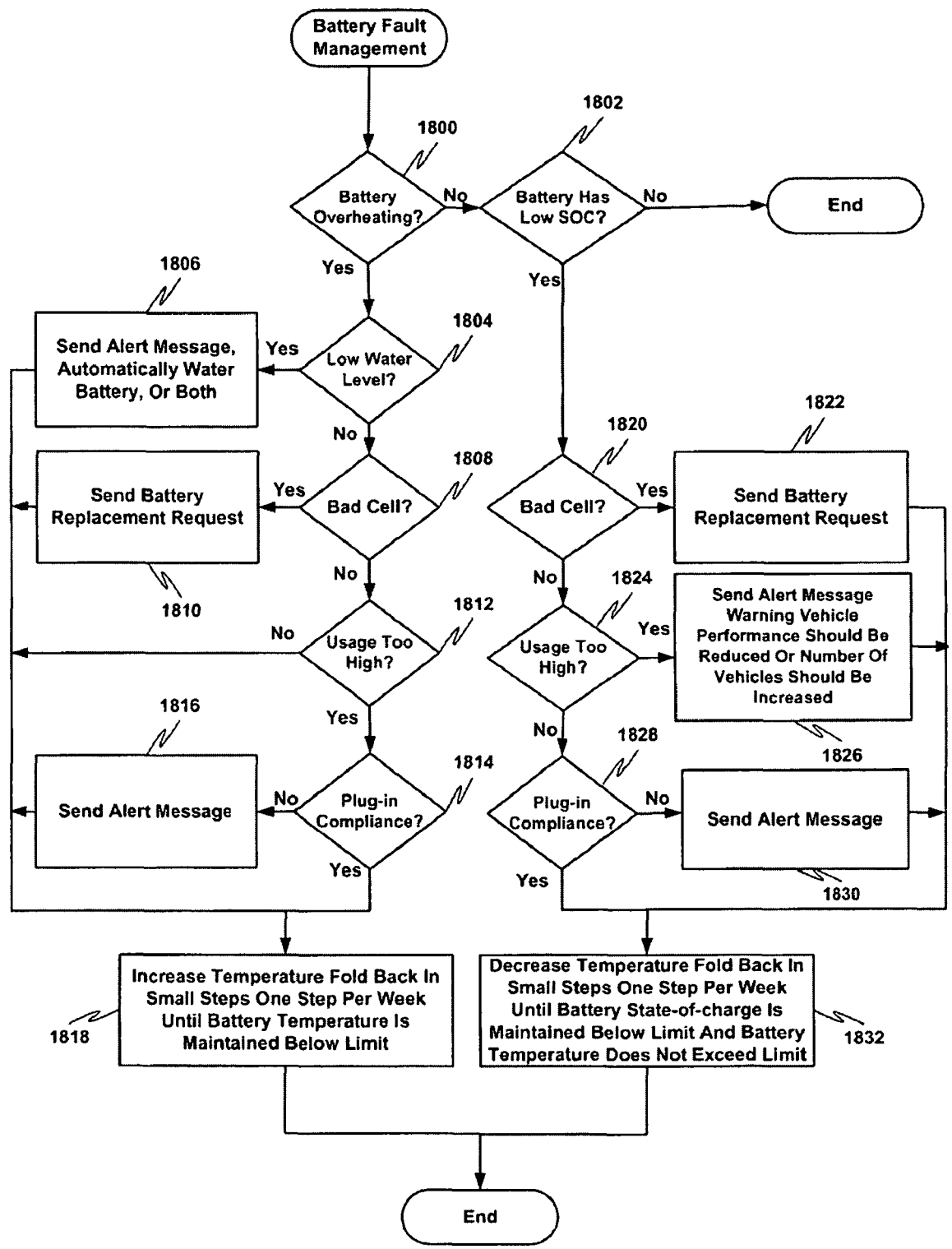
FIG. 18 is a flow diagram that illustrates a method for battery fault management in accordance with one embodiment of the present invention.

Turning now to FIG. 18, a flow diagram that illustrates a method for battery fault management in accordance with one embodiment of the present invention is presented. FIG. 18 exemplifies issuing user alerts, issuing management recommendations, and automatically controlling attributes or operations of one or more devices based at least in part on device measurement data obtained from the one or more devices. The processes illustrated in FIG. 18 may be implemented in hardware, software, firmware, or a combination thereof. At 1800, a determination is made regarding whether a battery is overheating. If the battery is not overheating, at 1802 a determination is made regarding whether the battery has a low state-of-charge. If the battery has a low state-of-charge, at 1820 a determination is made regarding whether the battery has at least one bad cell. If the battery has at least one bad cell, a battery replacement request is sent at 1822. If the battery does not have at least one bad cell, at 1824 a determination is made regarding whether the battery usage is too high. If the battery usage is too high, at 1826 an alert message is sent, warning that the vehicle performance should be reduced, or the number of vehicles should be increased. If the battery usage is not too high, at 1828 a determination is made regarding whether plug-in compliance procedures are being adhered to. If the plug-in compliance procedures are not being adhered to, at 1830 an alert message is sent. If plug-in compliance procedures are being adhered to, at 1832 the temperature fold back is decreased in small steps, one step per week, until the battery state-of-charge is maintained below a first predetermined limit and the battery temperature does not exceed a second predetermined limit.

Still referring to FIG. 18, if battery overheating is indicated at 1800, at 1804 a determination is made regarding whether the battery water level is low. If the battery water level is low, at 1806 an alert message is sent. The alert message may be sent to one or more persons or entities. By way of example, the alert message may be sent to one or more of the shift supervisor, the battery supplier, and the supplier of a device associated with the battery. Alternatively or in addition thereto, the battery is automatically watered. If the battery water level is not low, at 1808 a determination is made regarding whether the battery has at least one bad cell. If the battery has at least one bad cell, a battery replacement request is sent at 1810. The battery replacement request may be sent to one or more persons or entities. By way of example, the battery replacement request may be sent to one or more of a battery service provider, the battery supplier, and the supplier of a device associated with the battery. If the battery does not have at least one bad cell, at 1812 a determination is made regarding whether the battery usage is too high. If the battery usage is too high, at 1814 a determination is made regarding whether plug-in compliance procedures are being adhered to. If the plug-in compliance procedures are not being adhered to, at 1816 an alert message is sent. If plug-in compliance procedures are being adhered to, at 1818 the temperature fold back is increased in small steps, one step per week, until the battery temperature is maintained below the second predetermined limit.

While the operations shown in FIG. 18 are illustrated in a specific order, other sequences of the operations are conceivable. For example, one or both of determinations 1804 and 1808 and their associated actions (reference numerals 1806 and 1810) may occur after determination 1814. Additionally, one or more of determinations 1820 and 1824 and their associated actions (reference numerals 1822 and 1826) may occur after determination 1828.

While embodiments of the present invention have been illustrated with respect to fork lifts having a replenishable battery pack, those of ordinary skill in the art will recognize that any device powered by a replenishable device may be used.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for vehicle management in a local area network, the method comprising:
  remotely receiving (1) identification data, (2) historical data, and (3) real-time data from a plurality of vehicles;

remotely receiving (4) identification data, (5) historical data, and (6) real-time data from batteries associated with the corresponding vehicles;

analyzing the data received from a vehicle and the historical data from one or more battery of the vehicle to generate (a) energy usage data, (b) charge compliance data, and (c) fault data; and using the energy usage data, the charge compliance data, and the fault data to determine whether vehicle energy usage is sub-optimal, wherein when vehicle energy usage is sub-optimal, sending a command to a controller coupled with the vehicle to control an action of the vehicle to seek to improve vehicle operation associated with energy usage and charge compliance.

2. The computer-implemented method for vehicle management of claim 1, further comprising:
identifying a low water level of the battery; and
sending a command to a watering system that effectuates automatic watering of the battery.

3. The computer-implemented method for vehicle management of claim 1, further comprising:
identifying a low state of charge of the one or more battery; and
triggering a reduction of temperature fold back in small steps per week of the one or more battery.

4. The computer-implemented method for vehicle management of claim 1, further comprising:
identifying a sub-optimized charging regimen of the one or more battery; and
triggering an adjustment of battery charge rates.

5. The computer-implemented method for vehicle management of claim 1, further comprising:
identifying a sub-par battery performance; and
initiating unscheduled battery equalization of the one or more battery.

6. A system for vehicle management in a local area network, the system comprising: a remote device manager computer including a remote controller, the remote device manager configured to:

remotely receive (1) identification data, (2) historical data, and (3) real-time data from a plurality of vehicles;

remotely receive (4) identification data, (5) historical data, and (6) real-time data from batteries associated with the corresponding vehicles;

analyze the data received from a vehicle and the historical data from one or more battery of the vehicle to generate (a) energy usage data, (b) charge compliance data, and (c) fault data; and use the energy usage data, the charge compliance data, and the fault data to determine whether vehicle energy usage is sub-optimal, wherein when vehicle energy usage is sub-optimal, send a command to a device controller coupled with the vehicle to control an action of the vehicle to seek to improve vehicle operation associated with energy usage and charge compliance.

7. The system of claim 6, the remote controller further configured to:
identify a low water level of the battery; and
send a command to a watering system that effectuates automatic watering of the one or more battery.

8. The system of claim 6, the remote controller further configured to:
identify a low state of charge of the one or more battery; and
trigger a reduction of temperature fold back in small steps per week of the one or more battery.

9. The system of claim 6, the remote controller further configured to:
identify a sub-optimized charging regimen of the one or more battery; and
trigger an adjustment of battery charge rates.

10. The system of claim 6, the remote controller further configured to:
identify a sub-par battery performance; and
initiate unscheduled battery equalization of the one or more battery.

* * * * *